United States Patent
Beaurepaire et al.

(10) Patent No.: US 9,210,321 B2
(45) Date of Patent: Dec. 8, 2015

(54) METHOD AND APPARATUS FOR A SHUTTER ANIMATION FOR IMAGE CAPTURE

(71) Applicant: HERE Global B.V., Veldhoven (NL)

(72) Inventors: Jerome Beaurepaire, Berlin (DE); Philippe Beaurepaire, Lamballe (FR)

(73) Assignee: Here Global B.V., LB Veldhoven (NL)

( * ) Notice: Subject to any disclaimer, the term of this patent is extended or adjusted under 35 U.S.C. 154(b) by 30 days.

(21) Appl. No.: 14/098,267

(22) Filed: Dec. 5, 2013

(65) Prior Publication Data
US 2015/0163399 A1  Jun. 11, 2015

(51) Int. Cl.
| | |
|---|---|
| H04N 5/232 | (2006.01) |
| H04N 5/235 | (2006.01) |
| H04N 5/262 | (2006.01) |
| G06T 13/00 | (2011.01) |
| G06T 13/20 | (2011.01) |
| G06T 13/40 | (2011.01) |

(52) U.S. Cl.
CPC ....... H04N 5/23229 (2013.01); H04N 5/23212 (2013.01); H04N 5/23293 (2013.01)

(58) Field of Classification Search
USPC ............... 382/103, 154, 195; 348/239, 222.1; 345/473, 949
See application file for complete search history.

(56) References Cited

U.S. PATENT DOCUMENTS

| | | | | |
|---|---|---|---|---|
| 7,151,541 B2 * | 12/2006 | Seder | ............................ | 345/473 |
| 2009/0237547 A1 * | 9/2009 | Misawa et al. | ........... | 348/333.01 |
| 2010/0020221 A1 * | 1/2010 | Tupman et al. | .......... | 348/333.01 |
| 2011/0164128 A1 * | 7/2011 | Burgett et al. | .................. | 348/77 |
| 2011/0216209 A1 | 9/2011 | Fredlund et al. | | |
| 2013/0188086 A1 | 7/2013 | Fujiki | | |
| 2014/0063316 A1 * | 3/2014 | Lee et al. | ................. | 348/333.02 |
| 2014/0098199 A1 * | 4/2014 | Yeatman et al. | ................ | 348/48 |
| 2014/0333831 A1 * | 11/2014 | Oh et al. | ....................... | 348/376 |
| 2015/0092103 A1 * | 4/2015 | Lundgren et al. | ............. | 348/371 |

FOREIGN PATENT DOCUMENTS

| | | |
|---|---|---|
| EP | 1137246 A | 9/2001 |
| WO | 2012154585 A | 11/2012 |

OTHER PUBLICATIONS

Phase One, "User Guide Capture One 4, Capture One 4 PRO, Capture One 4 DB," http://www.digitalfusion.net/pdf/phaseone/Capture-One_User-Guide.pdf, Dec. 23, 2008, 111 pages.

* cited by examiner

Primary Examiner — Tuan Ho
Assistant Examiner — Marly Camargo
(74) Attorney, Agent, or Firm — Harrington & Smith

(57) ABSTRACT

A method comprising receiving visual information from a camera module, causing display of a representation of, at least part of, the visual information, determining an autofocus point based, at least in part, on the visual information, capturing an image based, at least in part, on the visual information such that focus of the image conforms to the autofocus point, and causing display of the image and a shutter animation such that the shutter animation overlays the image and the shutter animation has a closing point that corresponds with a position on the image that correlates with the autofocus point is disclosed.

20 Claims, 13 Drawing Sheets

_METHOD AND APPARATUS FOR A SHUTTER ANIMATION FOR IMAGE CAPTURE_

TECHNICAL FIELD

The present application relates generally to a shutter animation for image capture.

BACKGROUND

As electronic apparatuses have expanded their capabilities, as well as the number and types of operations they perform, interaction has become increasingly complex and time consuming. For example, apparatus interaction may be prone to errors, confusion, and/or delay. In some circumstances, a user may miss an opportunity to do something, such as capture an image of an event, due to delays associated with interaction. In other circumstances, a user may avoid utilizing an apparatus capability due to a desire to avoid errors, confusion, or delay. These problems may be more pronounced with regard to a user capturing an image. Under such circumstances, it may be desirable for a user to be able to capture an image in a simple, quick, and intuitive manner.

SUMMARY

Various aspects of examples of the invention are set out in the claims.

One or more embodiments may provide an apparatus, a computer readable medium, a non-transitory computer readable medium, a computer program product, and a method for receiving visual information from a camera module, causing display of a representation of, at least part of, the visual information, determining an autofocus point based, at least in part, on the visual information, capturing an image based, at least in part, on the visual information such that focus of the image conforms to the autofocus point, and causing display of the image and a shutter animation such that the shutter animation overlays the image and the shutter animation has a closing point that corresponds with a position on the image that correlates with the autofocus point.

One or more embodiments may provide an apparatus, a computer readable medium, a computer program product, and a non-transitory computer readable medium having means for receiving visual information from a camera module, means for causing display of a representation of, at least part of, the visual information, means for determining an autofocus point based, at least in part, on the visual information, means for capturing an image based, at least in part, on the visual information such that focus of the image conforms to the autofocus point, and means for causing display of the image and a shutter animation such that the shutter animation overlays the image and the shutter animation has a closing point that corresponds with a position on the image that correlates with the autofocus point.

In at least one example embodiment, the determination of the autofocus point comprises determination of one or more autofocus point candidates based, at least in part on the visual information, and selection of the autofocus point from the autofocus point candidates.

In at least one example embodiment, the selection is performed absent user input indicative of the autofocus point.

One or more example embodiments further perform causation of display of at least one representation of the autofocus point candidates that overlays the representation of the visual information.

One or more example embodiments further perform causation of display of a representation of the autofocus point at a position on the image that corresponds with the autofocus point.

One or more example embodiments further perform termination of display of the representation of the visual information based, at least in part the capture of the image.

In at least one example embodiment, the termination of display of the representation of the visual information is performed such that the causation of display of the image replaces the display of the representation of the visual information.

One or more example embodiments further perform determination that the shutter animation has completed, termination of display of the image based, at least in part, on the determination that the shutter animation has completed, receipt of different visual information from the camera module, and causation of display of a representation of, at least part of, the different visual information.

In at least one example embodiment, the shutter animation comprises a succession of images that indicate a closing aperture that is centered at the closing point, such that, at least part of, the image is visible within the closing aperture.

In at least one example embodiment, the shutter animation comprises a succession of images that indicate a closing aperture that is centered at the closing point, such that, at least part of, the image is obscured outside of the closing aperture.

In at least one example embodiment, the shutter animation further comprises a succession of images that indicate an opening aperture that is centered at the closing point, such that, at least part of, the image is visible within the opening aperture.

In at least one example embodiment, the shutter animation comprises the succession of images that indicate the opening aperture subsequent to the images that indicate the closing aperture.

In at least one example embodiment, the shutter animation further comprises a succession of images that indicate an opening aperture that is centered at the closing point, such that, at least part of, the image is obscured outside of the opening aperture.

In at least one example embodiment, the causation of display of the shutter animation is performed such that the shutter animation completes within 500 milliseconds.

In at least one example embodiment, the visual information is a visual information stream, and the causation of display of the representation of the visual information is performed such that the representation of the visual information is updated to reflect the visual information stream.

One or more example embodiments further perform identification of a visual representation of an object that corresponds with the autofocus point, and causation of display of the visual representation of the object such that the visual representation of the object overlays the shutter animation.

One or more example embodiments further perform determination that the shutter animation has completed, and termination of display of the representation of the object based, at least in part, on the determination that the shutter animation has completed.

One or more example embodiments further perform receipt of information indicative of an image capture input, wherein the capture of the image is based, at least in part, on the image capture input.

In at least one example embodiment, the autofocus point is at a position that fails to correlate with a center of the image.

In at least one example embodiment, the closing point is at a position that fails to correlate with the center of the image.

BRIEF DESCRIPTION OF THE DRAWINGS

For a more complete understanding of embodiments of the invention, reference is now made to the following descriptions taken in connection with the accompanying drawings in which.

DETAILED DESCRIPTION OF THE DRAWINGS

Figure 1:
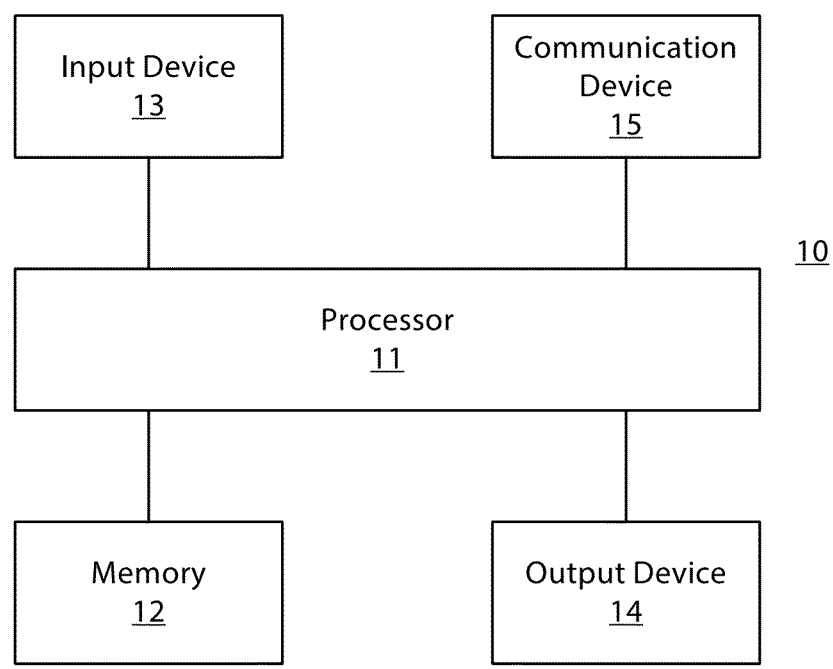
FIG. 1 is a block diagram showing an apparatus according to an example embodiment.

An embodiment of the invention and its potential advantages are understood by referring to FIGS. 1 through 9 of the drawings.

Some embodiments will now be described more fully hereinafter with reference to the accompanying drawings, in which some, but not all, embodiments are shown. Various embodiments of the invention may be embodied in many different forms and should not be construed as limited to the embodiments set forth herein; rather, these embodiments are provided so that this disclosure will satisfy applicable legal requirements. Like reference numerals refer to like elements throughout. As used herein, the terms "data," "content," "information," and similar terms may be used interchangeably to refer to data capable of being transmitted, received and/or stored in accordance with embodiments of the present invention. Thus, use of any such terms should not be taken to limit the spirit and scope of embodiments of the present invention.

Additionally, as used herein, the term 'circuitry' refers to (a) hardware-only circuit implementations (e.g., implementations in analog circuitry and/or digital circuitry); (b) combinations of circuits and computer program product(s) comprising software and/or firmware instructions stored on one or more computer readable memories that work together to cause an apparatus to perform one or more functions described herein; and (c) circuits, such as, for example, a microprocessor(s) or a portion of a microprocessor(s), that require software or firmware for operation even if the software or firmware is not physically present. This definition of 'circuitry' applies to all uses of this term herein, including in any claims. As a further example, as used herein, the term 'circuitry' also includes an implementation comprising one or more processors and/or portion(s) thereof and accompanying software and/or firmware. As another example, the term 'circuitry' as used herein also includes, for example, a baseband integrated circuit or applications processor integrated circuit for a mobile phone or a similar integrated circuit in a server, a cellular network apparatus, other network apparatus, and/or other computing apparatus.

As defined herein, a "non-transitory computer-readable medium," which refers to a physical medium (e.g., volatile or non-volatile memory device), can be differentiated from a "transitory computer-readable medium," which refers to an electromagnetic signal.

FIG. 1 is a block diagram showing an apparatus, such as an electronic apparatus 10, according to at least one example embodiment. It should be understood, however, that an electronic apparatus as illustrated and hereinafter described is merely illustrative of an electronic apparatus that could benefit from embodiments of the invention and, therefore, should not be taken to limit the scope of the invention. While electronic apparatus 10 is illustrated and will be hereinafter described for purposes of example, other types of electronic apparatuses may readily employ embodiments of the invention. Electronic apparatus 10 may be a personal digital assistant (PDAs), a pager, a mobile computer, a desktop computer, a television, a gaming apparatus, a laptop computer, a tablet computer, a media player, a camera, a video recorder, a mobile phone, a global positioning system (GPS) apparatus, an automobile, a kiosk, an electronic table, and/or any other types of electronic systems. Moreover, the apparatus of at least one example embodiment need not be the entire electronic apparatus, but may be a component or group of components of the electronic apparatus in other example embodiments. For example, the apparatus may be an integrated circuit, a set of integrated circuits, and/or the like.

Furthermore, apparatuses may readily employ embodiments of the invention regardless of their intent to provide mobility. In this regard, even though embodiments of the invention may be described in conjunction with mobile applications, it should be understood that embodiments of the invention may be utilized in conjunction with a variety of other applications, both in the mobile communications industries and outside of the mobile communications industries. For example, the apparatus may be, at least part of, a non-carryable apparatus, such as a large screen television, an electronic table, a kiosk, an automobile, and/or the like.

In at least one example embodiment, electronic apparatus 10 comprises processor 11 and memory 12. Processor 11 may be any type of processor, controller, embedded controller, processor core, and/or the like. In at least one example embodiment, processor 11 utilizes computer program code to cause an apparatus to perform one or more actions. Memory 12 may comprise volatile memory, such as volatile Random Access Memory (RAM) including a cache area for the temporary storage of data and/or other memory, for example, non-volatile memory, which may be embedded and/or may be removable. The non-volatile memory may comprise an EEPROM, flash memory and/or the like. Memory 12 may store any of a number of pieces of information, and data. The information and data may be used by the electronic apparatus 10 to implement one or more functions of the electronic apparatus 10, such as the functions described herein. In at least one example embodiment, memory 12 includes computer program code such that the memory and the computer program code are configured to, working with the processor, cause the apparatus to perform one or more actions described herein.

The electronic apparatus 10 may further comprise a communication device 15. In at least one example embodiment, communication device 15 comprises an antenna, (or multiple antennae), a wired connector, and/or the like in operable communication with a transmitter and/or a receiver. In at least one example embodiment, processor 11 provides signals to a transmitter and/or receives signals from a receiver. The signals may comprise signaling information in accordance with a communications interface standard, user speech, received data, user generated data, and/or the like. Communication device 15 may operate with one or more air interface standards, communication protocols, modulation types, and access types. By way of illustration, the electronic communication device 15 may operate in accordance with second-generation (2G) wireless communication protocols IS-136 (time division multiple access (TDMA)), Global System for Mobile communications (GSM), and IS-95 (code division multiple access (CDMA)), with third-generation (3G) wireless communication protocols, such as Universal Mobile Telecommunications System (UMTS), CDMA2000, wideband CDMA (WCDMA) and time division-synchronous CDMA (TD-SCDMA), and/or with fourth-generation (4G) wireless communication protocols, wireless networking protocols, such as 802.11, short-range wireless protocols, such as Bluetooth, and/or the like. Communication device 15 may operate in accordance with wireline protocols, such as Ethernet, digital subscriber line (DSL), asynchronous transfer mode (ATM), and/or the like.

Processor 11 may comprise means, such as circuitry, for implementing audio, video, communication, navigation, logic functions, and/or the like, as well as for implementing embodiments of the invention including, for example, one or more of the functions described herein. For example, processor 11 may comprise means, such as a digital signal processor device, a microprocessor device, various analog to digital converters, digital to analog converters, processing circuitry and other support circuits, for performing various functions including, for example, one or more of the functions described herein. The apparatus may perform control and signal processing functions of the electronic apparatus 10 among these devices according to their respective capabilities. The processor 11 thus may comprise the functionality to encode and interleave message and data prior to modulation and transmission. The processor 1 may additionally comprise an internal voice coder, and may comprise an internal data modem. Further, the processor 11 may comprise functionality to operate one or more software programs, which may be stored in memory and which may, among other things, cause the processor 11 to implement at least one embodiment including, for example, one or more of the functions described herein. For example, the processor 11 may operate a connectivity program, such as a conventional internet browser. The connectivity program may allow the electronic apparatus 10 to transmit and receive internet content, such as location-based content and/or other web page content, according to a Transmission Control Protocol (TCP), Internet Protocol (IP), User Datagram Protocol (UDP), Internet Message Access Protocol (IMAP), Post Office Protocol (POP), Simple Mail Transfer Protocol (SMTP), Wireless Application Protocol (WAP), Hypertext Transfer Protocol (HTTP), and/or the like, for example.

The electronic apparatus 10 may comprise a user interface for providing output and/or receiving input. The electronic apparatus 10 may comprise an output device 14. Output device 14 may comprise an audio output device, such as a ringer, an earphone, a speaker, and/or the like. Output device 14 may comprise a tactile output device, such as a vibration transducer, an electronically deformable surface, an electronically deformable structure, and/or the like. Output device 14 may comprise a visual output device, such as a display, a light, and/or the like. In at least one example embodiment, the apparatus causes display of information, the causation of display may comprise displaying the information on a display comprised by the apparatus, sending the information to a separate apparatus that comprises a display, and/or the like. The electronic apparatus may comprise an input device 13. Input device 13 may comprise a light sensor, a proximity sensor, a microphone, a touch sensor, a force sensor, a button, a keypad, a motion sensor, a magnetic field sensor, a camera, and/or the like. A touch sensor and a display may be characterized as a touch display. In an embodiment comprising a touch display, the touch display may be configured to receive input from a single point of contact, multiple points of contact, and/or the like. In such an embodiment, the touch display and/or the processor may determine input based, at least in part, on position, motion, speed, contact area, and/or the like. In at least one example embodiment, the apparatus receives an indication of an input. The apparatus may receive the indication from a sensor, a driver, a separate apparatus, and/or the like. The information indicative of the input may comprise information that conveys information indicative of the input, indicative of an aspect of the input indicative of occurrence of the input, and/or the like.

The electronic apparatus 10 may include any of a variety of touch displays including those that are configured to enable touch recognition by any of resistive, capacitive, infrared, strain gauge, surface wave, optical imaging, dispersive signal technology, acoustic pulse recognition or other techniques, and to then provide signals indicative of the location and other parameters associated with the touch. Additionally, the touch display may be configured to receive an indication of an input in the form of a touch event which may be defined as an actual physical contact between a selection object (e.g., a finger, stylus, pen, pencil, or other pointing device) and the touch display. Alternatively, a touch event may be defined as bringing the selection object in proximity to the touch display, hovering over a displayed object or approaching an object within a predefined distance, even though physical contact is not made with the touch display. As such, a touch input may comprise any input that is detected by a touch display including touch events that involve actual physical contact and touch events that do not involve physical contact but that are otherwise detected by the touch display, such as a result of the proximity of the selection object to the touch display. A touch display may be capable of receiving information associated with force applied to the touch screen in relation to the touch input. For example, the touch screen may differentiate between a heavy press touch input and a light press touch input. In at least one example embodiment, a display may display two-dimensional information, three-dimensional information and/or the like.

In embodiments including a keypad, the keypad may comprise numeric (for example, 0-9) keys, symbol keys (for example, #, *), alphabetic keys, and/or the like for operating the electronic apparatus 10. For example, the keypad may comprise a conventional QWERTY keypad arrangement. The keypad may also comprise various soft keys with associated functions. In addition, or alternatively, the electronic apparatus 10 may comprise an interface device such as a joystick or other user input interface.

Input device 13 may comprise a media capturing element. The media capturing element may be any means for capturing an image, video, and/or audio for storage, display or transmission. For example, in at least one example embodiment in which the media capturing element is a camera module, the camera module may comprise a digital camera which may form a digital image file from a captured image. As such, the camera module may comprise hardware, such as a lens or other optical component(s), and/or software necessary for creating a digital image file from a captured image. Alternatively, the camera module may comprise only the hardware for viewing an image, while a memory device of the electronic apparatus 10 stores instructions for execution by the processor 11 in the form of software for creating a digital image file from a captured image. In at least one example embodiment, the camera module may further comprise a processing element such as a co-processor that assists the processor 11 in processing image data and an encoder and/or decoder for compressing and/or decompressing image data. The encoder and/or decoder may encode and/or decode according to a standard format, for example, a Joint Photographic Experts Group (JPEG) standard format.

Figure 2A:
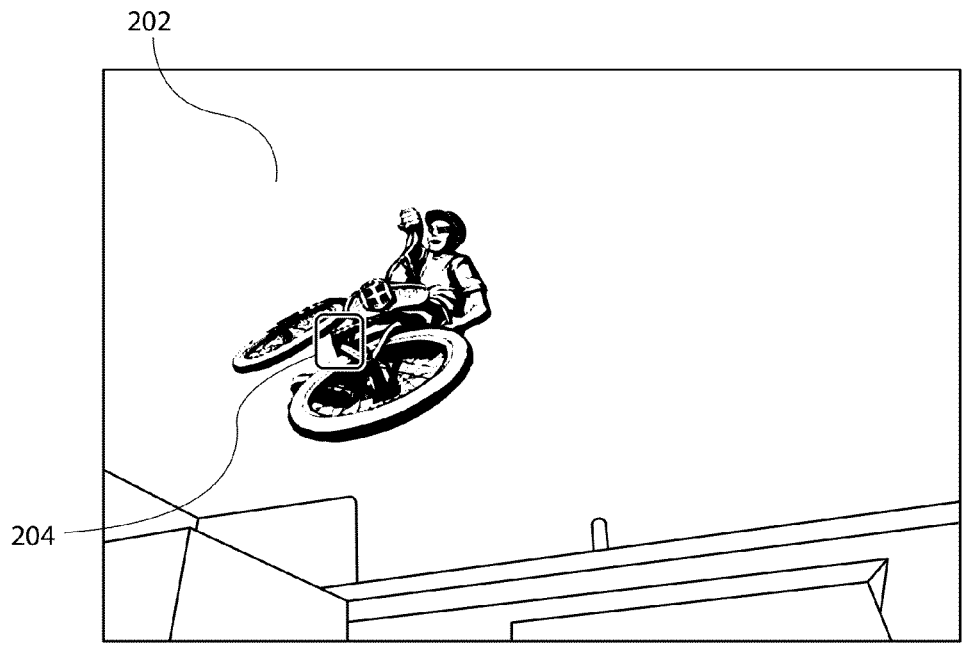
FIGS. 2A-2B are diagrams illustrating autofocus points according to at least one example embodiment.
Figure 2B:

FIGS. 2A-2B are diagrams illustrating autofocus points according to at least one example embodiment. The examples of FIGS. 2A-2B are merely examples and do not limit the scope of the claims. For example, number of autofocus points may vary, position of autofocus points may vary, and/or the like.

As camera modules of electronic apparatuses have become more robust, many users have come to prefer utilization of electronic apparatuses for capture of images. For example, many users appreciate the ease in which electronic images may be shared, stored, and/or edited. In addition, the electronic apparatus may be configured to perform various operations that assist with capture of the image.

In at least one example embodiment, the apparatus receives visual information from a camera module. The visual information may be any image or video format. The apparatus may temporarily store at least part of the visual information for purposes of processing a captured image, for enhancing one or more characteristic of the visual information, and/or the like. In at least one example embodiment, the apparatus causes display of a representation of, at least part of, the visual information. For example, the apparatus may provide for a viewfinder interface that the user may utilize for capturing an image. In such an example, the viewfinder interface may comprise the representation of the visual information from the camera module. In this manner, the user may utilize the representation of the visual information to understand the subject matter of an image that the user may capture. For example, the user may utilize the displayed representation of the visual information when determining whether to capture an image, when to capture an image, which processing effects may be beneficial, and/or the like.

In at least one example embodiment, the visual information is a visual information stream. The visual information stream may be a succession of visual information that is updated over time as the camera module receives new information. For example, the camera module may be configured to acquire visual information on a periodic basis such that the visual information provided by the camera module represents real-time changes in the objects perceived by the camera module. In at least one example embodiment, causation of display of the representation of the visual information is performed such that the representation of the visual information is updated to reflect the visual information stream. In this manner, the representation of the visual information may be updated to reflect the changes in the objects perceived by the camera such that the user may better understand the evolving circumstances with respect to the camera module. For example, the user may be able to identify a desired object of an image moving to an undesirable position in the visual information, an undesired object entering the visual information, a desired object becoming obscured in the visual information, and/or the like.

In at least one example embodiment, the apparatus comprises a display. In such an example, the apparatus may cause display of information, such as the visual information, by displaying the visual information. In at least one example embodiment, the apparatus causes display of information by way of sending the information to a separate apparatus for display. For example, the apparatus may utilize a separate near eye display for presenting information to the user. In such an example, causation of display of the information may comprise sending the information to the near eye display for display by the near eye display.

In at least one example embodiment, the apparatus comprises the camera module. In such an example, the apparatus may receive visual information from the comprised camera module. In at least one example embodiment, the apparatus receives the visual information from a separate apparatus that comprises the camera module. In this manner, the apparatus may receive visual information indirectly from the camera module. For example, the apparatus may utilize a separate camera apparatus to acquire the visual information. In such an example, receipt of the visual information may be from the separate camera apparatus.

In many circumstances, users rely upon autofocus functionality when capturing an image. For example, a user may prefer to have the apparatus automatically focus upon one or more identified parts of an image without the user performing manual adjustment to the focus of the image. Even though in some circumstances, an electronic apparatus and/or a camera module may be capable of capturing an image such that multiple object representations within the image are in focus, some users may desire one or more of such object representations to be out of focus in the image. In this manner, such users may desire a particular esthetic quality to the image by way of having particular objects being represented as in focus and other objects being represented as out of focus. In at least one example embodiment, a representation of an object being out of focus refers to the representation of the object being blurred, partially transparent, lighter, and/or the like, in comparison to an in focus representation of the object. For example, an out of focus representation of a car, for example in the background of an image, may be blurred. In another example, an out of focus representation of a branch, for example in the foreground of an image, may be partially transparent and blurred such that subject matter behind the representation of the branch is represented in the image.

In at least one example embodiment, an apparatus determines focus of an image based, at least in part, on one or more autofocus points. In at least one example embodiment, an autofocus point is a position within visual information that identifies an object that is desired to be in focus. In this manner, the apparatus may capture the image in conformance with the autofocus point. For example, the apparatus may capture the image such that the object identified by the autofocus point is in focus. Similarly, the autofocus point may designate a portion of an object, such as a person's face. In such an example, the apparatus may capture the image in conformance with the autofocus point such that the face of the person is in focus. However, other parts of the person may not necessarily be in focus in the image. For example, a hand of the person, may be significantly closer to the camera module such that the representation of the hand in the image is out of focus.

In at least one example embodiment, an apparatus determines the autofocus point based, at least in part, on the visual information received from the camera module. For example, the apparatus may perform object recognition to identify one or more objects that the user may desire to have in focus. For example, the apparatus may utilize face identification to determine an autofocus point that corresponds with a part of the visual information that represents a person's face. In another example, the apparatus may identify a moving object in the visual information to determine an autofocus point that corresponds with the moving object. In this manner, the autofocus point may identify a position within the visual information to be in focus. For example, the autofocus point may be at a position that correlates with a center of an image, at a position that fails to correlate with the center of the image, and/or the like. In some circumstances, the apparatus may receive visual information that comprises representations of objects that are in focus. However, in such circumstances, at least some of such representations of objects may fail to correspond with an autofocus point. In such circumstances, the apparatus may modify the representations of the objects to become out of focus. For example, the apparatus may introduce and/or increase blurring of the representation of the object, transparency of the representation of the object, lightness of the representation of the object, and/or the like.

In at least one example embodiment, the apparatus captures an image based, at least in part, on the visual information. For example, the apparatus may save information from a frame of the visual information as an image, may invoke an image capture operation on the camera module so that the apparatus receives the image from the camera module, and/or the like. The apparatus may configure the camera module to capture the image in conformance with the autofocus point. For example, the apparatus may indicate a focal depth for capture of the image. In this manner, the camera module may adjust a physical focus element, such as a lens, to conform to the focal depth of the autofocus point. In some circumstances, the apparatus may receive the image such that the image comprises representations of objects that are in focus. However, is such circumstances, at least some of such representation of objects may fail to correspond with an autofocus point. In such circumstances, the apparatus may modify the image so that representations of such objects to become out of focus. For example, the apparatus may modify the image to introduce and/or increase blurring of the representation of the object, transparency of the representation of the object, lightness of the representation of the object, and/or the like.

In some circumstances, the user may desire to be aware of the position of the autofocus point. For example, the user may desire a particular point of focus, but may desire to avoid manually setting the point of focus. In such an example, the user may desire to ascertain whether the autofocus point corresponds with the user's desired point of focus. In such circumstances, the user may desire to perceive an indication that identifies the autofocus point, that identifies the position on the image that corresponds with the autofocus point, to identify a position in the visual information that corresponds with the autofocus point, and/or the like. In at least one example embodiment, the apparatus causes display of a representation of the autofocus point. For example, the apparatus may cause display of a visual indicator, such as an icon, a shape, and/or the like at a position that corresponds with the autofocus point. In some circumstances, if the user determines that the autofocus point fails to correspond with the desired point of focus, the user may capture another image, may decide to edit the image at a later time, and/or the like. In this manner, the user may determine suitability of the image by way of deciding the suitability of the autofocus point. Even though there may be many different aspects that govern suitability of an image for the purposes of the user, the user may gain a high level of insight into the suitability of the image based on determination that the autofocus point corresponds with the user's desired point of focus.

FIG. 2A is a diagram illustrating an autofocus point according to at least one example embodiment. The example of FIG. 2A illustrates autofocus point 204 of visual information 202. Visual information 202 may be visual information received by a camera module and displayed as, at least part of, a viewfinder interface, for example, for a camera program. It can be seen that, in the example of FIG. 2A, the apparatus has caused display of a rectangular representation of autofocus point 204. In this manner, the user may perceive that autofocus point 204 corresponds with a representation of the bicycle. In addition, the user may perceive that autofocus point 204 corresponds with a position in the visual information that is substantially vertically centered and horizontally leftward of the center. In this manner, the user may identify whether the autofocus point is at a desirable position. In at least one example embodiment, an apparatus may capture an image based, at least in part, on visual information 202 and autofocus point 204. For example the image may be captured such that the bicycle that corresponds with autofocus point 204 is represented in focus, and the building behind the bicycle is represented out of focus.

FIG. 2B is a diagram illustrating a plurality of autofocus points according to at least one example embodiment. In some circumstances, the apparatus may determine a plurality of autofocus points.

In at least one example embodiment, determination of the autofocus point comprises determination of one or more autofocus point candidates based, at least in part on the visual information. An autofocus point candidate may be an autofocus point that has the potential to be desirable for use in capturing of the image. In at least one example embodiment, the apparatus selects an autofocus point from the autofocus candidates. In this manner, the apparatus may identify a larger number of autofocus point candidates than the apparatus uses for capture of the image. For example, the apparatus may identify a plurality of autofocus point candidates, and select a single autofocus point.

In at least one example embodiment, the apparatus receives information indicative of an autofocus point selection input. In such an example, the autofocus point selection input may be an input that identifies a user's desire for a particular autofocus point. For example, the autofocus point selection input may be a touch input that identifies one or more autofocus point candidates for selection of an autofocus point. In at least one example embodiment, the apparatus causes display of at least one representation of the autofocus point candidates that overlays the representation of the visual information. The autofocus point selection input may be based, at least in part on, the representation of the autofocus point candidates. For example, the autofocus point selection input may be a touch input that identifies one or more of the representations of the autofocus point candidates for selection of an autofocus point. For example, the autofocus point selection input may be a touch input at a position on a display that corresponds with display of a representation of an autofocus point candidate such that the autofocus point candidate is selected as the autofocus point.

In at least one example embodiment, the apparatus automatically selects one or more autofocus points from the autofocus point candidates. In at least one example embodiment, automatic selection refers to the apparatus selecting one or more autofocus points absent receipt of input indicative of an autofocus point selection. For example, the apparatus may perform selection absent user input indicative of the autofocus point. In at least one example embodiment, the apparatus may evaluate the autofocus point candidates, and automatically select one or more autofocus points based, at least in part on the evaluation. For example, the apparatus may utilize object recognition to select an autofocus point candidate associated with a representation of a particular object instead of an autofocus point candidate associated with a representation of a different object. For example, the apparatus may select an autofocus point candidate associated with a face instead of an autofocus candidate associated with a representation of a car. However, it should be understood that there are various criteria and/or types of evaluation that an apparatus may perform in selecting an autofocus point and/or an autofocus candidate, and that such criteria and/or types of evaluation do not limit the claims in any way.

The example of FIG. 2B illustrates autofocus point candidates 254, 256, and 258 of visual information 252. Visual information 252 may be visual information received by a camera module and displayed as, at least part of, a viewfinder interface, for example for a camera program. It can be seen that, in the example of FIG. 2B, the apparatus has caused display of a rectangular representation of autofocus point candidates 254, 256, and 258. In this manner, the user may perceive that autofocus point candidates 254, 256, and 258 correspond with different parts of a representation of the leaf. In addition, the user may perceive that autofocus point candidates 254, 256, and 258 correspond with various positions in the visual information that are leftward of the center. In this manner, the user may identify whether one or more of the autofocus point candidates are at a desirable position. In at least one example embodiment, an apparatus may capture an image based, at least in part, on visual information 252 and selection of one or more of the autofocus point candidates 254, 256, and 258. For example, the image may be captured such that the part of the leaf that corresponds with autofocus point candidate 254 is represented in focus, and the branches behind the leaf are represented out of focus. In such an example, the apparatus may capture the image such that other parts of the leaf that fail to correspond with autofocus point candidate 254 are, at least partially, out of focus.

FIGS. 3A-3D are diagrams illustrating a shutter animation according to at least one example embodiment. The examples of FIGS. 3A-3D are merely examples and do not limit the scope of the claims. For example, number of frames comprised by the shutter animation may vary, style of the shutter animation may vary, and/or the like.

In at least one example embodiment, an apparatus captures an image. For example, the apparatus may capture the image based, at least in part, on visual information and an autofocus point, similarly as described regarding FIGS. 2A-2B. In at least one example embodiment, the apparatus captures the image based, at least in part, on receipt of information indicative of an image capture input. The image capture input may comprise actuation of a button, a touch input that corresponds with an image capture interface element, and/or the like. In at least one example embodiment, receipt of information indicative of an image capture input, causes the capture of the image.

In some circumstances, a user may desire to be notified that an image has been captured. For example, the user may desire visual feedback that indicates capture of the image. For example, the user may desire to perceive that an image has been captured, so that the user can decide whether or not to capture another image, to capture a replacement image, and/ or the like. In many circumstances, the user may desire that the visual indication that the image has been captured be an unambiguous representation of an image being captured. Many users identify the diaphragm shutter with film photography. A diaphragm shutter may be a number of thin blades which briefly uncover a camera aperture to make the exposure. The blades slide over each other in a way which creates a circular aperture which enlarges to uncover the whole lens, stays open for the desired time, then closes in the same manner.

In at least one example embodiment, the apparatus denotes capture of an image by way of a shutter animation. In at least one example embodiment, a shutter animation comprises a succession of images that indicate a closing aperture and/or an opening aperture that is centered at the closing point. For example, upon capture of an image, the apparatus may cause display of the image and a shutter animation such that the shutter animation overlays the image. The indication of the closing aperture and/or opening aperture may be illustrated to be indicative of a diaphragm shutter. The succession of images may be a video, a series of distinct images, and/or the like. The images may indicate the closing aperture by way of successive images that illustrate a smaller aperture than the previous image. In at least one example embodiment, at least part of the image being captured is visible within the closing aperture. In this manner, the shutter animation may overlay the image such that at least part of the image is visible within the aperture of the shutter animation. In at least one example embodiment, the shutter portion of the shutter animation obscures, at least part of, the captured image. In this manner, the shutter animation may overlay the image such that at least part of the image outside of the aperture is obscured. The closing aperture may be considered to be centered at a particular point by way of the aperture of the shutter animation being centered at that particular point, by way of the shutter closing towards that particular point, by way of the shutter animation indicating closing by the animation reducing the size of the aperture to become that particular point, and/or the like. In at least one example embodiment, such a particular point is referred to as the closing point of the shutter animation. For example, the closing point of the shutter animation may be the point at which the shutter becomes a closed shutter, a point at the center of the open shutter, a point to which the shutter closes towards, and/or the like.

Figure 3A:
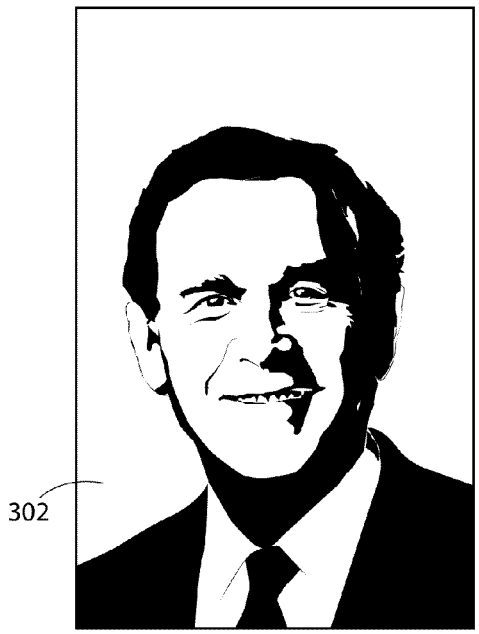
FIGS. 3A-3D are diagrams illustrating a shutter animation according to at least one example embodiment.
Figure 3B:
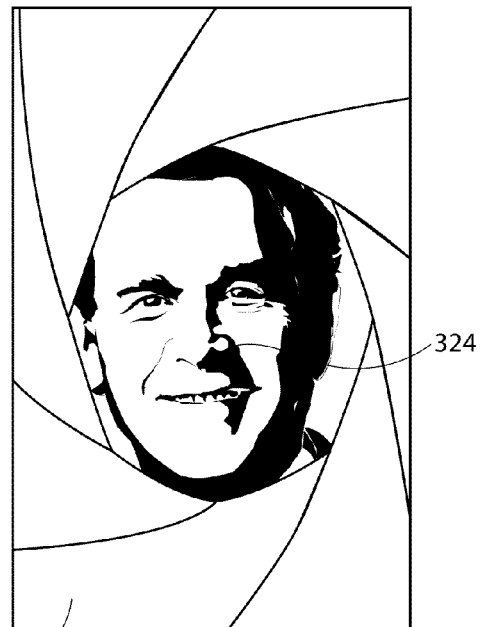
Figure 3C:
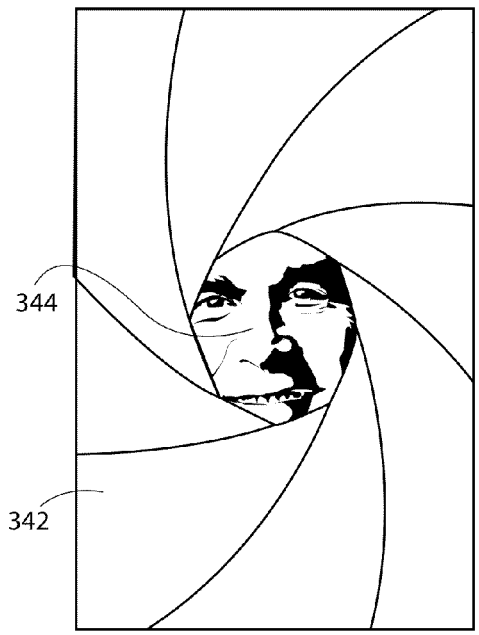

The example of FIGS. 3A-3D illustrate, at least part of, a shutter animation. FIG. 3A illustrates image 302. In at least one example embodiment, image 302 may be an image that was captured by the apparatus. In such an example, FIG. 3A may be a representation of image 302 prior to a shutter animation, subsequent to completion of a shutter animation, and/or the like. FIG. 3B illustrates a part of the shutter animation where shutter representation 322 shows a shutter having an aperture 324. It can be seen that shutter representation 322 overlays image 302. It can be seen that shutter representation 322 occludes, at least part of image 302. It can be seen that at least part of image 302 is visible within aperture 324. FIG. 3C illustrates a part of the shutter animation where shutter representation 342 shows a shutter having an aperture 344. It can be seen that shutter representation 342 overlays image 302. It can be seen that shutter representation 342 occludes, at least part of image 302. It can be seen that at least part of image 302 is visible within aperture 344. It can be seen that aperture 344 is smaller than aperture 324. In this manner, a shutter animation that progresses from shutter representation 322 to shutter representation 342 may be indicative of a shutter closing animation. Similarly, a shutter animation that progresses from shutter representation 342 to shutter representation 322 may be indicative of a shutter opening animation.

Figure 3D:
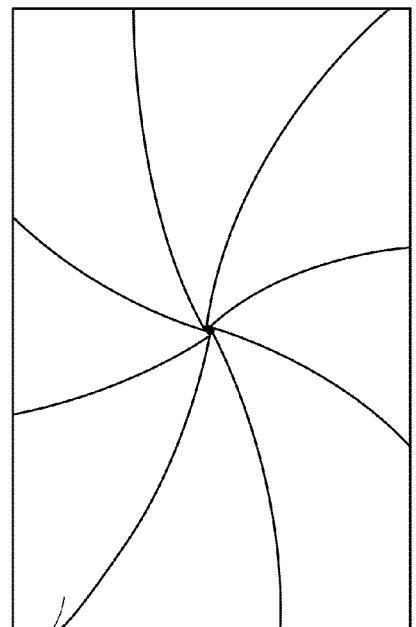

FIG. 3D illustrates a part of the shutter animation where shutter representation 362 shows a shutter having a completely closed aperture. It can be seen that shutter representation 342 occludes the entirety of image 302. In at least one example embodiment, a shutter animation that progresses from the completely open shutter representation of FIG. 3A to the completely closed shutter representation of FIG. 3D is a shutter closing animation. In at least one example embodiment, a shutter animation that progresses from the completely closed shutter representation of FIG. 3D to the completely open shutter representation of FIG. 3A is a shutter opening animation. In at least one example embodiment, the shutter animation comprises a shutter closing animation and a shutter opening animation. For example, the shutter animation may comprise the shutter closing animation prior to the shutter opening animation.

Even though the example of FIGS. 3A-3D illustrate a shutter animation that completely closes, different shutter animations may vary the amount of shutter closing illustrated by the shutter animation. For example, in some embodiments the shutter animation may illustrate a shutter representation that fails to completely close.

FIGS. 4A-4H are diagrams illustrating shutter animations according to at least one example embodiment. The examples of FIGS. 4A-4H are merely examples and do not limit the scope of the claims. For example, number of frames comprised by the shutter animation may vary, style of the shutter animation may vary, and/or the like.

As previously described, it may be desirable for the user to identify when an image has been captured and to identify an autofocus point to which the capture of the image conformed. In many circumstances, the user may desire to be able to identify both the capture of the image and the autofocus point together. For example, in some circumstances, the user may desire to avoid having an autofocus point representation interfere with their perception of visual information prior to the capture of the image. In such an example, the user may desire to avoid any representation of the autofocus point prior to the capture of the image, but may still desire to identify the autofocus point after the image has been captured. For example, the user may be relying on the apparatus to automatically select the autofocus point, and may only be concerned about whether the automatically selected autofocus point meets the user's expectations. In another example, the user may desire to view autofocus point candidate representations, but may desire to avoid viewing any indication of a selected autofocus point until the image is captured.

Furthermore, the user may desire to be able to use the same mechanism for identifying that the image has been captured and for identifying the autofocus point. For example, the user may desire to avoid having an overabundance of information to evaluate when the image is captured. In such an example, the user may desire to avoid identifying that the image was captured by way of an indication, such as replacing the visual information with the captured image, and identifying the autofocus point by way of a different indication, such as an autofocus point representation. Even though such indications may be useful for supplementation purposes, the user may desire to avoid being completely reliant upon such identification.

In at least one example embodiment, upon capture of an image, an apparatus causes display of the image and a shutter animation such that the shutter animation has a closing point that corresponds with a position on the image that correlates with the autofocus point. In this manner, the shutter animation may serve to signify the capture of the image and identify the autofocus point of the image. For example, the apparatus may determine the position of the image that corresponds with the focus point by way of correlation between the position of the autofocus point in the visual information and the position in the captured image. In this manner, the apparatus may adapt a shutter animation so that the closing point of the shutter animation identifies the autofocus point. Therefore, even though the apparatus may provide supplemental identifications, the user may be able to perceive both the capture of the image and the position of the autofocus point, by way of the shutter animation. In at least one example embodiment, the closing point is at a position that fails to correlate with the center of the image. For example, the autofocus point may have been at a position in the visual information that fails to correlation with the center of the visual information. In this manner, the closing point of the shutter animation may fail to be determined solely by the dimensions of the image, the orientation of the image, and/or the like.

In addition, the user may desire to reduce the amount of time associated with identification of the capture of the image and the autofocus point. For example, the user may desire to avoid delaying a subsequent image capture operation. In such an example, the user may desire to view more than mere display of the image to identify that the image has been captured. For example, it may take the user a greater amount of time to identify that the visual information has been replaced with the image than for the apparatus to perform a shutter animation that identifies the capture of the image. In addition, the user may desire to view more than a mere autofocus point representation to identify the autofocus point. For at least these further reasons, the user may desire to identify the capture of the image and the autofocus point by way of the shutter animation that has a closing point that corresponds with the position of the autofocus point.

For example, the human eye is highly accustomed to identification of movement, tracking of movement, anticipating a future position by way of movement, and/or the like. For example, humans may quickly identify a small object that moves, but may have a very difficult time finding the same object without any movement. In this manner, the user may be able to quickly perceive the shutter animation by way of the user's eye being attracted by the movement of the shutter animation. In this manner, the duration of the shutter animation may be less than a non-movement indication of the image capture or a non-movement indicator of the autofocus point, without compromising the user's ability to perceive the shutter animation.

In addition, for many users, it is very intuitive to predict a future position of an object after perceiving even a minute portion of movement by the object. For example, a person can quickly identify rightward motion from leftward motion. In this manner, the user may be able to quickly identify the closing point of the shutter animation by way of the user being able to track and predict the shutter animation. For example, the user may be able to quickly identify a future convergence point of the aperture for a shutter closing animation, a past divergence point of the aperture for a shutter opening animation, and/or the like. In this manner, the duration of the shutter animation may be less than a non-movement indication of the image capture or a non-movement indicator of the autofocus point, without compromising the user's ability to perceive the shutter animation.

Therefore, for at least any one of these reasons, a user may benefit from a shutter animation that has a closing point that corresponds with a position on the image that correlates with the autofocus point. In addition, the amount of time for completion of the shutter animation may be significantly less than the duration of a non-movement for of capture and focus point identification. For example, it may take a user one to two seconds to identify both capture of the image and a position of an autofocus point representation. However, the user may be able to identify both capture of the same image and the same position of the autofocus point within 500 milliseconds, regardless of whether or not the apparatus provides any other signification of the capture of the image or the position of the autofocus representation.

In some circumstances, an apparatus may fail to determine an autofocus point on the visual information. For example, the apparatus may fail to identify any focus point candidates, may fail to select any focus point candidates, may fail to receive any input indicative of selection of a focus point candidate, and/or the like. In such circumstances, the apparatus may indicate the absence of an autofocus point by way of the shutter animation. For example, the shutter animation may indicate a partial closing of the aperture. In such an example the shutter animation may omit representing the aperture of the shutter animation reaching a completely closed representation. In another example, the speed of the shutter animation may indicate lack of an autofocus point. For example, the shutter animation associated with absence of an autofocus point may be slower than the shutter animation associated with an autofocus point. In this manner, the user may perceive a resistance of the shutter animation when closing in the absence of the autofocus point.

Even though the apparatus may provide an indication of the autofocus point by way of the shutter animation, other indications that allow the user to perceive the autofocus point may be utilized as well. For example, haptic feedback may be utilized to indicate number of autofocus points, absence of an autofocus point, and/or the like. In such an example, the apparatus may provide haptic feedback to indicate a position of the autofocus point. In such an example, the haptic signal may be stronger at a position that corresponds with the position of the autofocus point that at a position that fails to correspond with the position of the autofocus point.

Figure 4A:
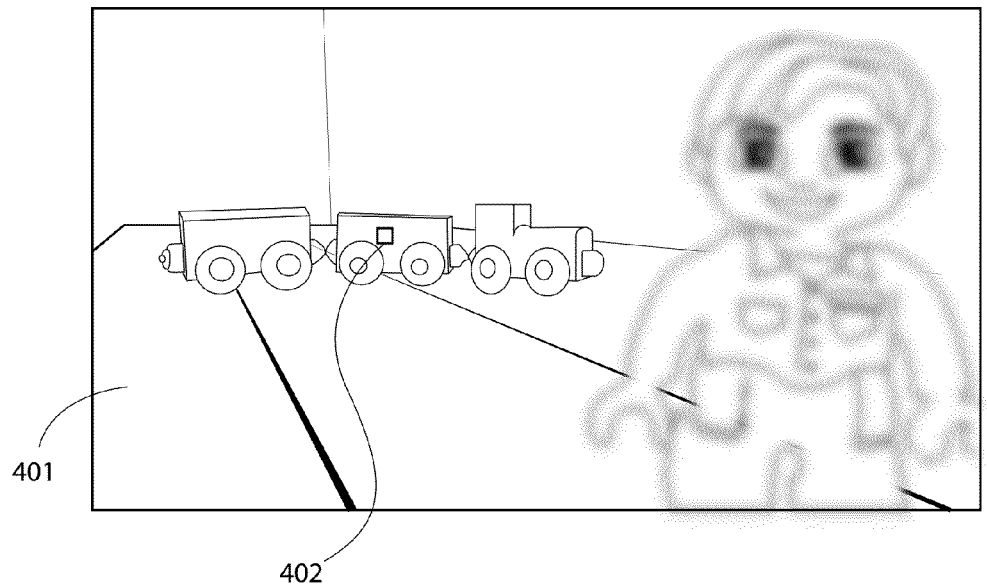
FIGS. 4A-4H are diagrams illustrating shutter animations according to at least one example embodiment.

FIGS. 4A-4D illustrate a shutter animation in relation to image 401. In at least one example embodiment, an apparatus causes display of image 401 upon capture of image 401, and causes display of the shutter animation upon capture of image 401. In the example of FIG. 4A, image 401 was captured in conformance to autofocus point 402. Even though the example of FIG. 4A illustrates a representation of autofocus point 402, other examples may avoid display of a representation of autofocus point 402. It can be seen that the train car corresponding with autofocus point 402 is represented as being in focus. It can be seen that the figurine, which is closer to the camera module, is represented as being out of focus.

Figure 4B:
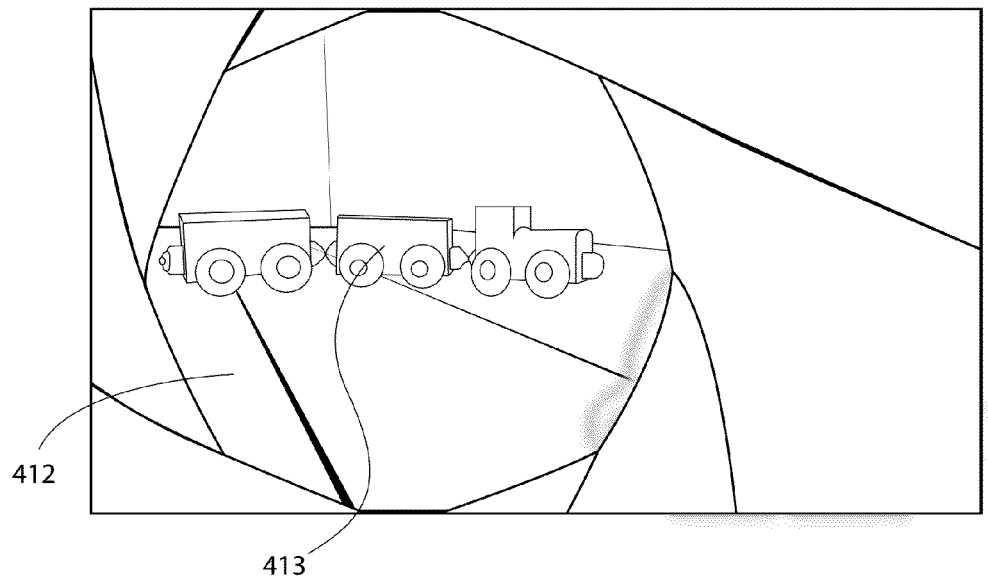

FIG. 4B is a diagram illustrating a frame of a shutter animation in relation to image 401 according to at least one example embodiment. FIG. 4B illustrates a frame of the shutter animation where the aperture of the shutter animation is sized as shown by aperture 412. It can be seen that closing point 413 of the shutter animation corresponds with the position of the autofocus point 402. It can be seen that the shutter animation overlays image 401 such that at least part of image 401 can be seen through aperture 412, and that the shutter outside of aperture 412 occludes the corresponding part of image 401. In at least one example embodiment, there may be frames that are displayed between the frame of FIG. 4B and the frame of FIG. 4A. For example, there may be frames that illustrate an aperture larger than aperture 412.

Figure 4C:
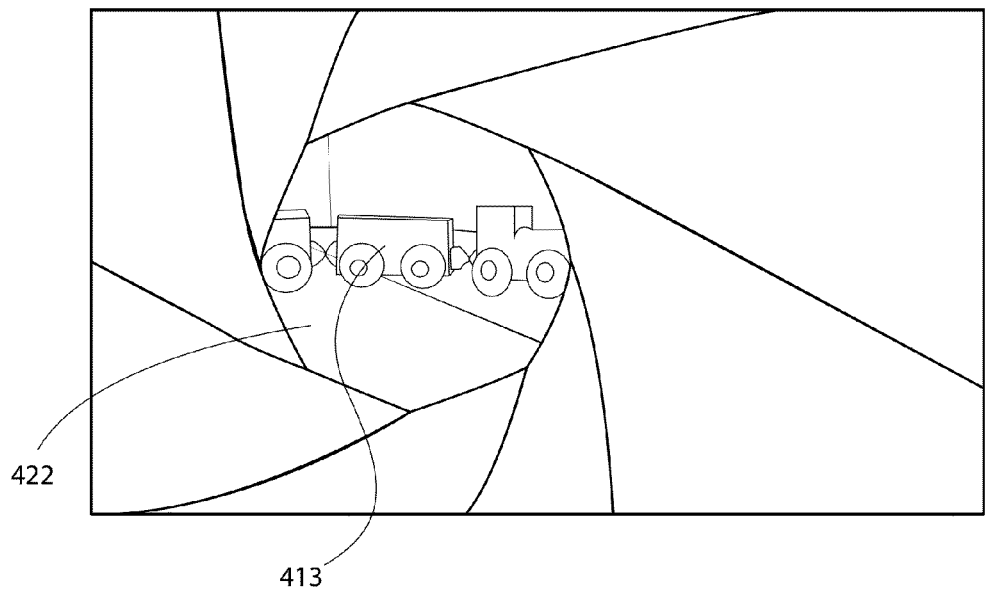

FIG. 4C is a diagram illustrating another frame of a shutter animation in relation to image 401 according to at least one example embodiment. FIG. 4C illustrates a frame of the shutter animation where the aperture of the shutter animation is sized as shown by aperture 422. It can be seen that closing point 413 of the shutter animation corresponds with the position of the autofocus point 402. It can be seen that the shutter animation overlays image 401 such that at least part of image 401 can be seen through aperture 422, and that the shutter outside of aperture 422 occludes the corresponding part of image 401. In at least one example embodiment, there may be frames that are displayed between the frame of FIG. 4C and the frame of FIG. 4B. For example, there may be frames that illustrate an aperture larger than aperture 422 and smaller than aperture 412.

Figure 4D:
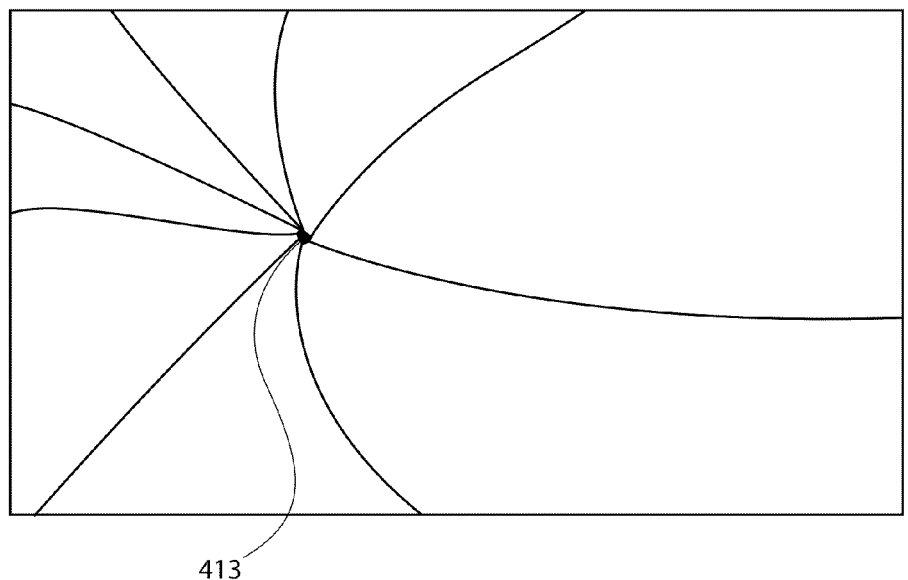

FIG. 4D is a diagram illustrating another frame of a shutter animation in such that the shutter is completely closed. It can be seen that closing point 413 of the shutter animation corresponds with the position of the autofocus point 402. It can be seen that the shutter animation overlays image 401 such that the shutter occludes the entirety of image 401. In at least one example embodiment, there may be frames that are displayed between the frame of FIG. 4D and the frame of FIG. 4C. For example, there may be frames that illustrate an aperture that is open, but that is smaller than aperture 422.

It can be seen that the progression from FIG. 4A to FIG. 4D illustrates a shutter closing animation. Similarly, the progression from FIG. 4D to FIG. 4A illustrates a shutter opening animation. In at least one example embodiment, the shutter animation may comprise at least part of the shutter closing animation, at least part of the shutter opening animation, and/or the like.

Figure 4E:
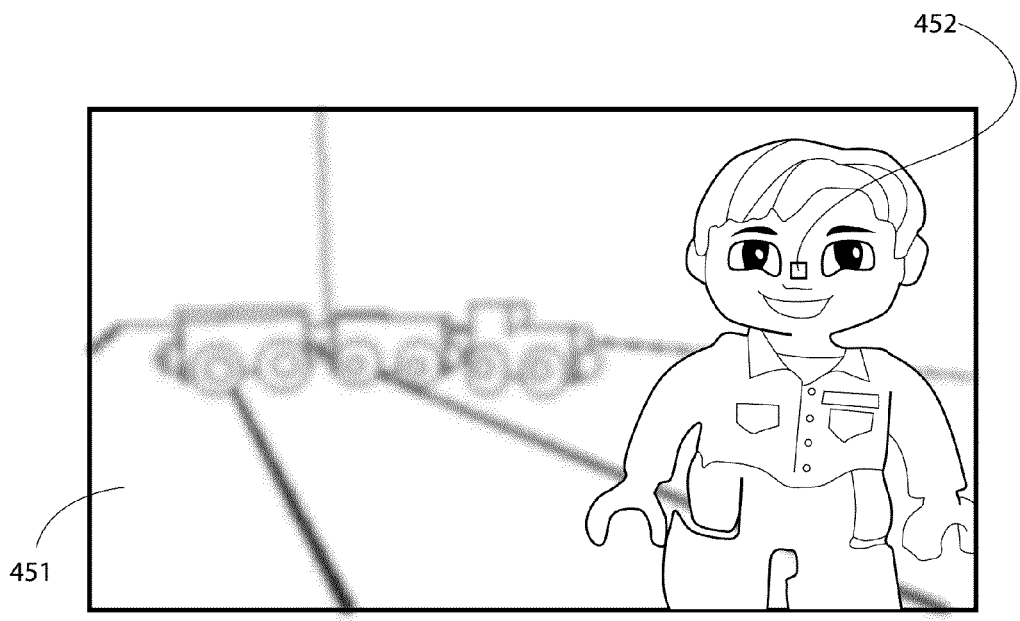

FIGS. 4E-4H illustrate a shutter animation in relation to image 451. In at least one example embodiment, an apparatus causes display of image 451 upon capture of image 451, and causes display of the shutter animation upon capture of image 451. In the example of FIG. 4E, image 451 was captured in conformance to autofocus point 452. Even though the example of FIG. 4E illustrates a representation of autofocus point 452, other examples may avoid display of a representation of autofocus point 452. It can be seen that the figurine corresponding with autofocus point 452 is represented as being in focus. It can be seen that the train, which is further from the camera module, is represented as being out of focus.

Figure 4F:
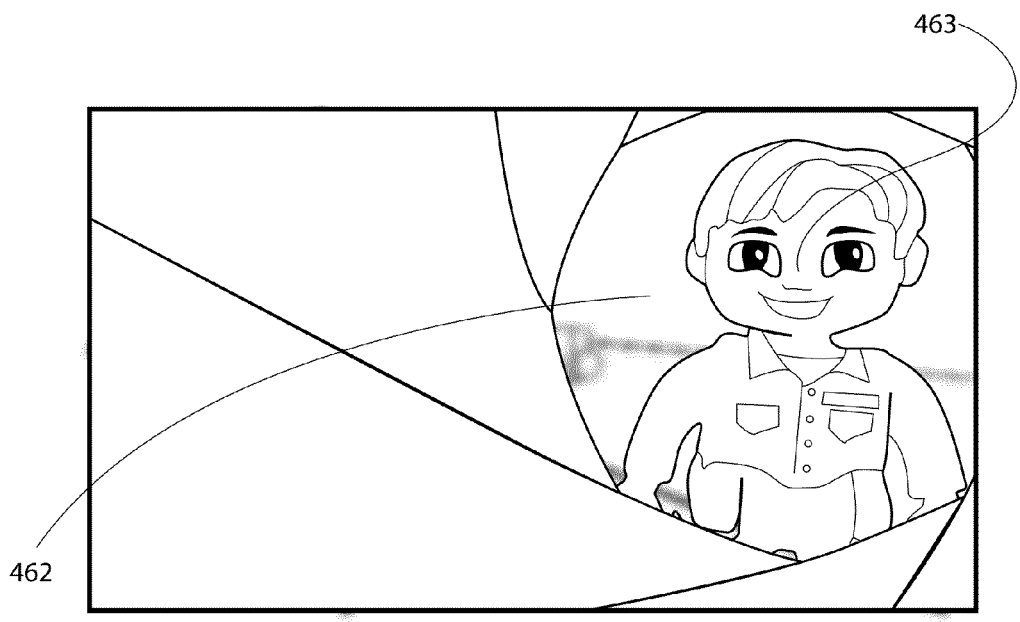

FIG. 4F is a diagram illustrating a frame of a shutter animation in relation to image 451 according to at least one example embodiment. FIG. 4F illustrates a frame of the shutter animation where the aperture of the shutter animation is sized as shown by aperture 462. It can be seen that closing point 463 of the shutter animation corresponds with the position of the autofocus point 452. It can be seen that the shutter animation overlays image 451 such that at least part of image 451 can be seen through aperture 462, and that the shutter outside of aperture 462 occludes the corresponding part of image 451. In at least one example embodiment, there may be frames that are displayed between the frame of FIG. 4F and the frame of FIG. 4E. For example, there may be frames that illustrate an aperture larger than aperture 462.

Figure 4G:
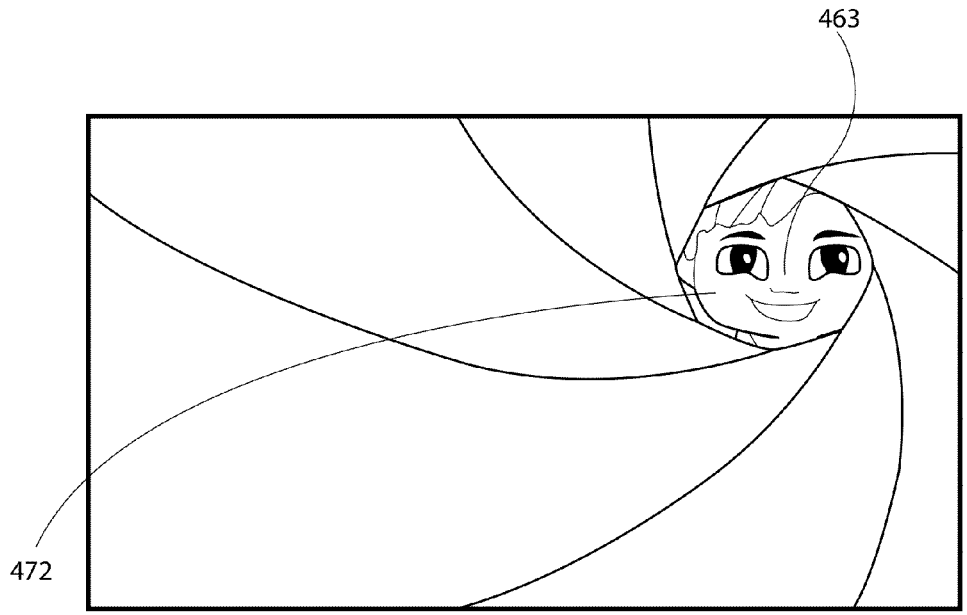

FIG. 4G is a diagram illustrating another frame of a shutter animation in relation to image 451 according to at least one example embodiment. FIG. 4G illustrates a frame of the shutter animation where the aperture of the shutter animation is sized as shown by aperture 472. It can be seen that closing point 463 of the shutter animation corresponds with the position of the autofocus point 452. It can be seen that the shutter animation overlays image 451 such that at least part of image 451 can be seen through aperture 472, and that the shutter outside of aperture 472 occludes the corresponding part of image 451. In at least one example embodiment, there may be frames that are displayed between the frame of FIG. 4G and the frame of FIG. 4F. For example, there may be frames that illustrate an aperture larger than aperture 472 and smaller than aperture 462.

Figure 4H:
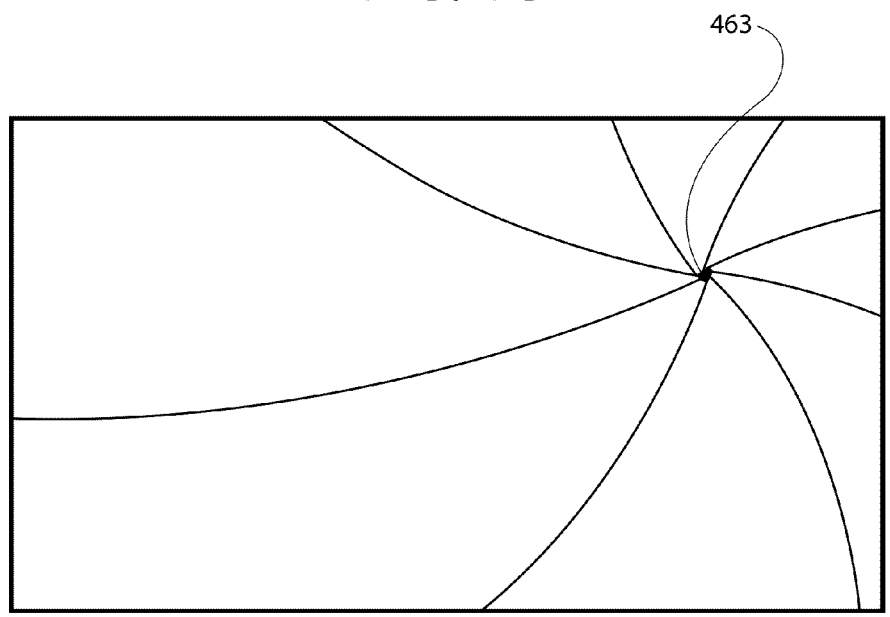

FIG. 4H is a diagram illustrating another frame of a shutter animation in such that the shutter is completely closed. It can be seen that closing point 463 of the shutter animation corresponds with the position of the autofocus point 452. It can be seen that the shutter animation overlays image 451 such that the shutter occludes the entirety of image 451. In at least one example embodiment, there may be frames that are displayed between the frame of FIG. 4H and the frame of FIG. 4G. For example, there may be frames that illustrate an aperture that is open, but that is smaller than aperture 472.

It can be seen that the progression from FIG. 4E to FIG. 4H illustrates a shutter closing animation. Similarly, the progression from FIG. 4H to FIG. 4E illustrates a shutter opening animation. In at least one example embodiment, the shutter animation may comprise at least part of the shutter closing animation, at least part of the shutter opening animation, and/or the like.

It can be seen that image 401 and image 451 are based on the same visual information, but on different autofocus points. In this manner, the difference between closing points 413 and 463 indicates the different autofocus points between image 401 and image 451. In this manner, the user may perceive that image 401 has a different autofocus points than image 451 by way of the shutter animation of FIGS. 4A-4D and/or the shutter animation of FIGS. 4E-4H. In this manner, the user may be able to perceive that image 401 has a different autofocus points than image 451 even if the user fails to notice that the train car is in focus in image 401 and out of focus in image 451, or that the figurine is out of focus in image 401 and in focus in image 451.

In some circumstances, the user may desire to capture multiple images of the same visual information such that different images are based, at least in part, on different autofocus points. For example, the user may desire to capture two or more images of the same subject matter such that each image has a different autofocus point. For example, the user may desire both image 401 of FIG. 4A and image 451 of FIG. 4E. In such circumstances, the apparatus may provide multiple shutter animations to identify the autofocus points of the images. For example, the apparatus may provide the shutter animation of FIGS. 4A-4D to indicate autofocus point 402, prior to providing the shutter animation of FIGS. 4E-4H. In this manner, each of these shutter animations may indicate the respective autofocus points of the captured images. In such an example, the images may be combined to form a combined image. Such a single image may indicate the autofocus points of the images that were combined to form the combined image. For example, objects associated with different autofocus points in different images may be represented in focus in the combined image.

FIGS. 5A-5D are diagrams illustrating a shutter animation according to at least one example embodiment. The examples of FIGS. 5A-5D are merely examples and do not limit the scope of the claims. For example, number of frames comprised by the shutter animation may vary, object representation may vary, style of the shutter animation may vary, and/or the like.

In some circumstances, it may be desirable to further enhance the user's ability to understand the ramification of the autofocus point when an image is captured. For example, the user may desire to quickly identify the object that correlates to the autofocus point. In such an example, the user may desire for a representation of the object to have prominence during the shutter animation. In this manner, the user may quickly identify the object by way of the prominence given to the representation of the object in the shutter animation.

In at least one example embodiment, the apparatus identifies a visual representation of an object that corresponds with the autofocus point. As previously described, in at least one example embodiment, the apparatus utilizes object identification when determining an autofocus point. The apparatus may utilize the object identification information to identify a visual representation of the object. For example, if the identification of the object comprises facial identification, the apparatus may identify a part of the image that corresponds with a representation of the face based, at least in part, on the facial identification information.

In at least one example embodiment, when the apparatus causes display of a shutter animation, the apparatus further causes display of the visual representation of the object such that the visual representation of the object overlays the shutter animation. In this manner, it may appear as if the shutter animation is closing in a manner that obscures the image, but fails to obscure the representation of the object. In at least one example embodiment, the apparatus may cause display of the representation of the object for the duration of the shutter animation. For example, the apparatus may cause display of the representation of the object upon display of the shutter animation, and terminate display of the representation of the object upon completion of the shutter animation. In such an example, the apparatus terminate display of the representation of the object based, at least in part, on the determination that the shutter animation has completed.

In some circumstances, the apparatus may continue to display the visual representation of the object after completion of the shutter animation. For example, the apparatus may cause display of the representation of the object such that the representation of the object overlays the visual information subsequent to the completion of the shutter animation. In this manner, the user may be able to perceive the correspondence of the representation of the objects with the visual information, even after the completion of the shutter animation.

In some circumstances, a user may desire to accumulate representations of objects over a particular period of time. For example, the user may take five images within a particular period of time. In such an example, each of the images may be associated with a different focus point. In such circumstances, it may be desirable for the user to simultaneously perceive representations of objects that correspond with objects of the autofocus points of the five images. In this manner, the apparatus may continue display of the representation of the object for the particular period of time such that multiple representations of objects from multiple images may be simultaneously displayed. In this manner, if the user desires a sixth image during the particular period of time, the user may perceive the representations of the objects associated with the previous five images. In this manner, the user may be able to perceive which autofocus points have been utilized for the previous five images. In this manner, the user may be able to modify image the manner in which he captures an additional image based on the representations of the objects from the previous images that were captured during the particular time period. For example, the user may select a different autofocus point for the additional image.

Figure 5A:
FIGS. 5A-5D are diagrams illustrating a shutter animation according to at least one example embodiment.

FIGS. 5A-5D illustrate a shutter animation in relation to image 501. In at least one example embodiment, an apparatus causes display of image 501 upon capture of image 501, and causes display of the shutter animation upon capture of image 501. In the example of FIG. 5A, image 501 was captured in conformance to autofocus point 502. Even though the example of FIG. 5A illustrates a representation of autofocus point 502, other examples may avoid display of a representation of autofocus point 502. It can be seen that the face corresponding with autofocus point 502 is represented as being in focus. It can be seen that the background, which is further from the camera module, is represented as being out of focus.

Figure 5B:
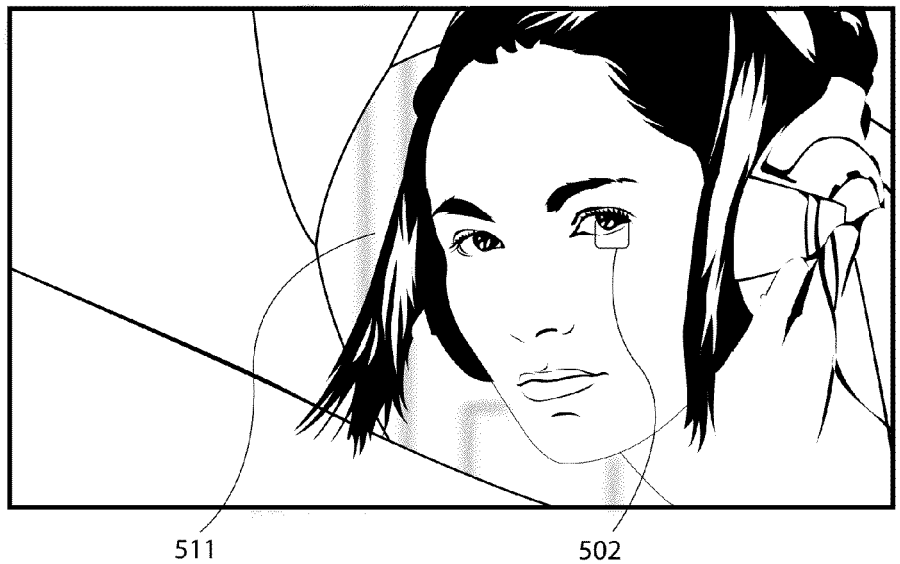

FIG. 5B is a diagram illustrating a frame of a shutter animation in relation to image 501 according to at least one example embodiment. FIG. 5B illustrates a frame of the shutter animation where the aperture of the shutter animation is sized as shown by aperture 511. It can be seen that the closing point of the shutter animation corresponds with the position of the autofocus point 502. It can be seen that the shutter animation overlays image 501 such that at least part of image 501 can be seen through aperture 511, and that the shutter outside of aperture 511 occludes the corresponding part of image 501. However, it can also be seen that the representation of the face that corresponds with autofocus point 502 overlays the shutter animation. In this manner, the shutter animation appears to be closing between the face and the background. In at least one example embodiment, there may be frames that are displayed between the frame of FIG. 5B and the frame of FIG. 5A. For example, there may be frames that illustrate an aperture larger than aperture 511.

Figure 5C:
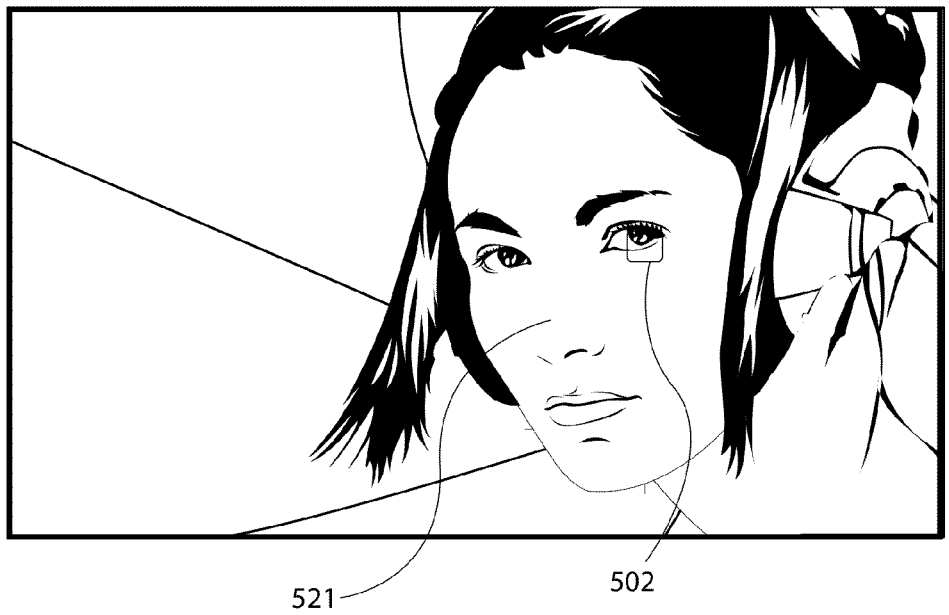

FIG. 5C is a diagram illustrating a frame of a shutter animation in relation to image 501 according to at least one example embodiment. FIG. 5C illustrates a frame of the shutter animation where the aperture of the shutter animation is sized as shown by aperture 521. It can be seen that the closing point of the shutter animation corresponds with the position of the autofocus point 502. It can be seen that the shutter animation overlays image 501 such that at least part of image 501 can be seen through aperture 521, and that the shutter outside of aperture 521 occludes the corresponding part of image 501. However, it can also be seen that the representation of the face that corresponds with autofocus point 502 overlays the shutter animation. In this manner, the shutter animation appears to be closing between the face and the background. In at least one example embodiment, there may be frames that are displayed between the frame of FIG. 5C and the frame of FIG. 5B. For example, there may be frames that illustrate an aperture larger than aperture 521 and smaller than aperture 511.

Figure 5D:
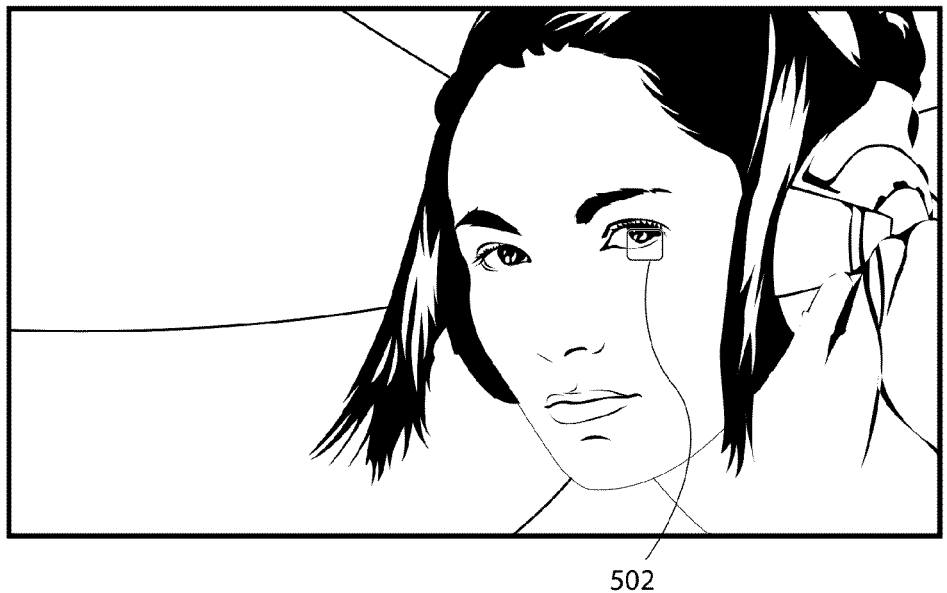

FIG. 5D is a diagram illustrating another frame of a shutter animation in such that the shutter is completely closed. It can be seen that the closing point of the shutter animation corresponds with the position of the autofocus point 502. It can be seen that the shutter animation overlays image 501 such that the shutter occludes the entirety of image 501. However, it can also be seen that the representation of the face that corresponds with autofocus point 502 overlays the shutter animation. In this manner, the shutter animation appears to be closing between the face and the background. In at least one example embodiment, there may be frames that are displayed between the frame of FIG. 5D and the frame of FIG. 5C. For example, there may be frames that illustrate an aperture that is open, but that is smaller than aperture 521.

It can be seen that the progression from FIG. 5A to FIG. 5D illustrates a shutter closing animation. Similarly, the progression from FIG. 5D to FIG. 5A illustrates a shutter opening animation. In at least one example embodiment, the shutter animation may comprise at least part of the shutter closing animation, at least part of the shutter opening animation, and/or the like.

Figure 6:
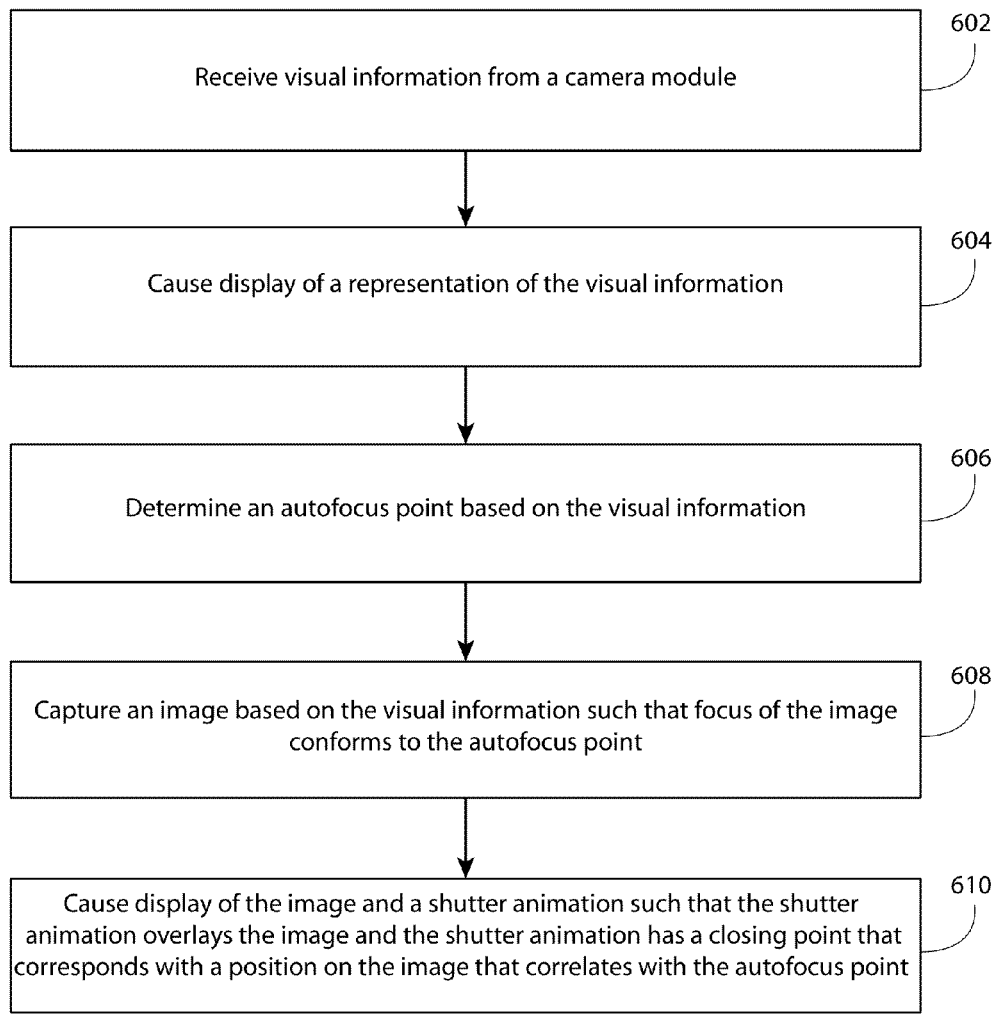
FIG. 6 is a flow diagram illustrating activities associated with a shutter animation according to at least one example embodiment.

FIG. 6 is a flow diagram illustrating activities associated with a shutter animation according to at least one example embodiment. In at least one example embodiment, there is a set of operations that corresponds with the activities of FIG. 6. An apparatus, for example electronic apparatus 10 of FIG. 1, or a portion thereof, may utilize the set of operations. The apparatus may comprise means, including, for example processor 11 of FIG. 1, for performance of such operations. In an example embodiment, an apparatus, for example electronic apparatus 10 of FIG. 1, is transformed by having memory, for example memory 12 of FIG. 1, comprising computer code configured to, working with a processor, for example processor 11 of FIG. 1, cause the apparatus to perform set of operations of FIG. 6.

At block 602, the apparatus receives visual information from a camera module. The receipt, the visual information, and the camera module may be similar as described regarding FIG. 1 and FIGS. 2A-2B.

At block 604, the apparatus causes display of a representation of, at least part of, the visual information. The causation of display and the representation may be similar as described regarding FIGS. 2A-2B.

At block 606, the apparatus determines an autofocus point based, at least in part, on the visual information. The determination and the autofocus point may be similar as described regarding FIGS. 2A-2B.

At block 608, the apparatus captures an image based, at least in part, on the visual information such that focus of the image conforms to the autofocus point. The capture, the image, the focus, and the conformance may be similar as described regarding FIGS. 2A-2B and FIGS. 3A-3D. In at least one example embodiment, the capture of the image may be caused by receipt of information indicative of an image capture input, similarly as described regarding FIGS. 3A-3D.

At block 610, the apparatus causes display of the image and a shutter animation such that the shutter animation overlays the image and the shutter animation has a closing point that corresponds with a position on the image that correlates with the autofocus point. The image, the shutter animation, the overlay, the correspondence, and the position may be similar as described regarding FIGS. 3A-3D, FIGS. 4A-4H, and FIGS. 5A-5D.

Figure 7:
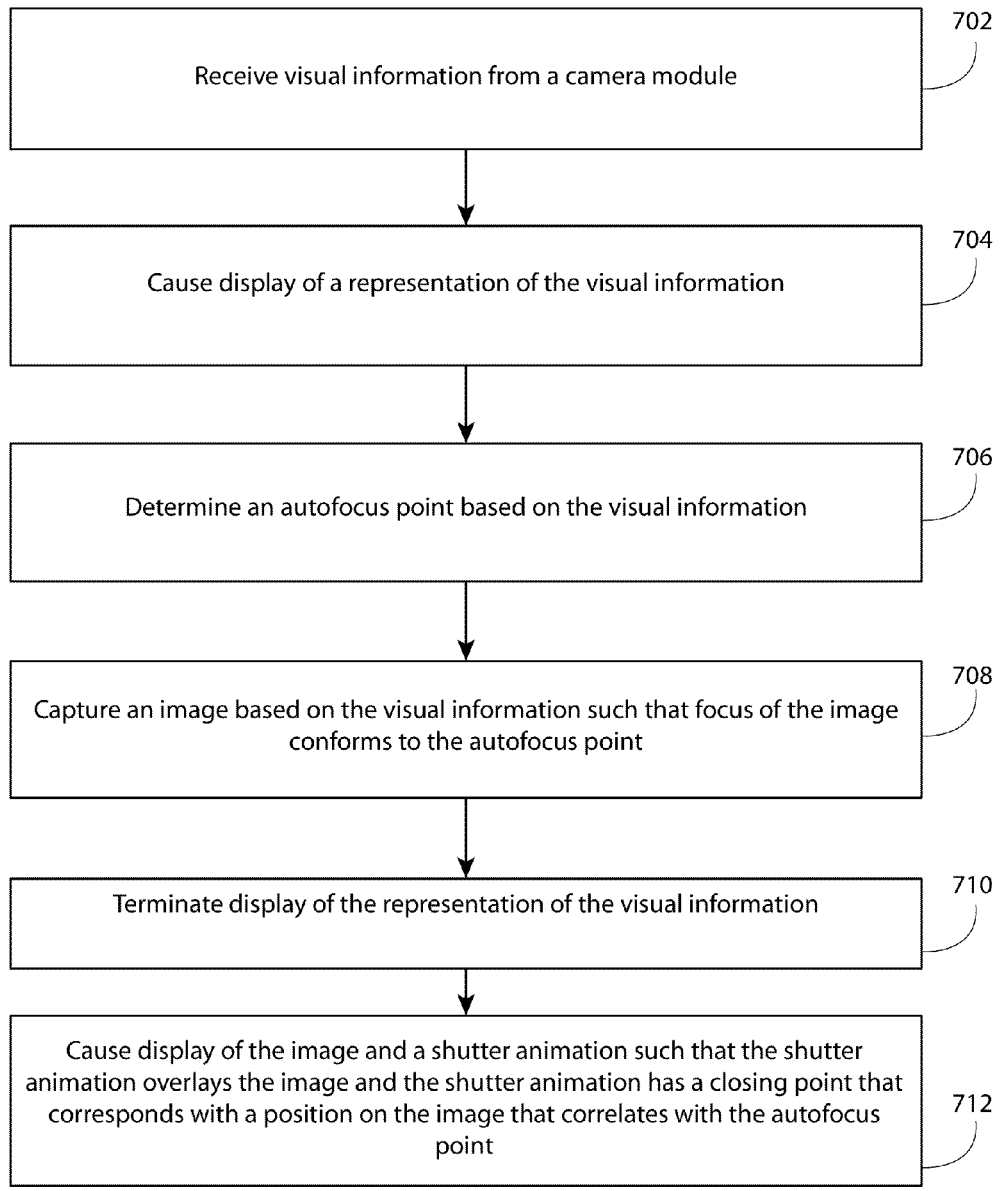
FIG. 7 is a flow diagram illustrating activities associated with a shutter animation according to at least one example embodiment.

FIG. 7 is a flow diagram illustrating activities associated with a shutter animation according to at least one example embodiment. In at least one example embodiment, there is a set of operations that corresponds with the activities of FIG. 7. An apparatus, for example electronic apparatus 10 of FIG. 1, or a portion thereof, may utilize the set of operations. The apparatus may comprise means, including, for example processor 11 of FIG. 1, for performance of such operations. In an example embodiment, an apparatus, for example electronic apparatus 10 of FIG. 1, is transformed by having memory, for example memory 12 of FIG. 1, comprising computer code configured to, working with a processor, for example processor 11 of FIG. 1, cause the apparatus to perform set of operations of FIG. 7.

In some circumstances, it may be desirable to terminate display of the visual information when the apparatus displays the image and the shutter animation. For example, the user may desire to temporarily suspend updating the visual information during display of the image, during display of the shutter animation, and/or the like.

At block 702, the apparatus receives visual information from a camera module, similarly as described regarding block 602 of FIG. 6. At block 704, the apparatus causes display of a representation of, at least part of, the visual information, similarly as described regarding block 604 of FIG. 6. At block 706, the apparatus determines an autofocus point based, at least in part, on the visual information, similarly as described regarding block 606 of FIG. 6. At block 708, the apparatus captures an image based, at least in part, on the visual information such that focus of the image conforms to the autofocus point, similarly as described regarding block 608 of FIG. 6.

At block 710, the apparatus terminates display of the representation of the visual information based, at least in part the capture of the image. In this manner, the termination of display of the visual information may be caused by the capture of the image.

At block 712, the apparatus causes display of the image and a shutter animation such that the shutter animation overlays the image and the shutter animation has a closing point that corresponds with a position on the image that correlates with the autofocus point, similarly as described regarding block 610 of FIG. 6. In at least one example embodiment, termination of display of the representation of the visual information and display of the image is performed such that the image replaces the representation of the visual information.

Figure 8:
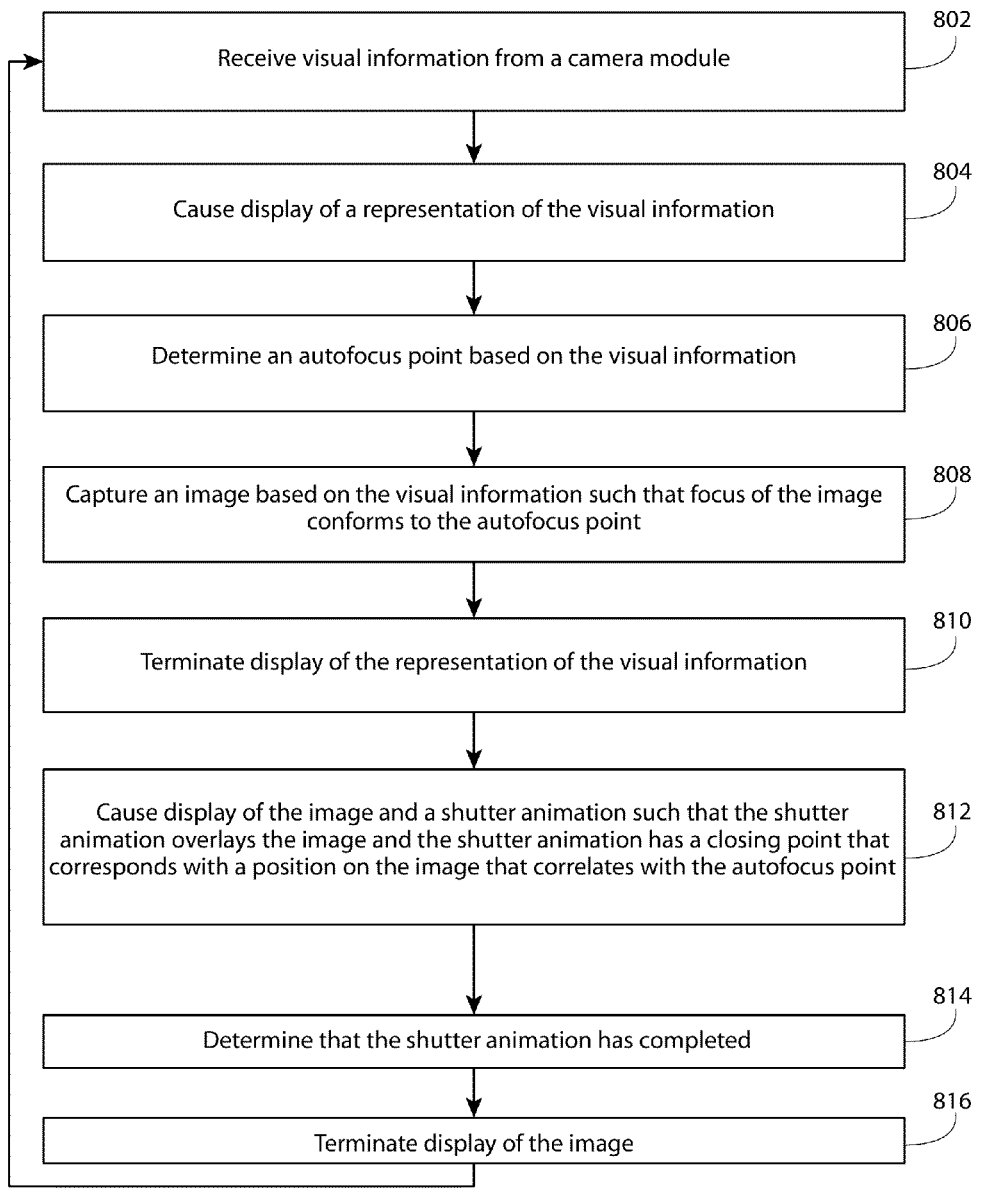
FIG. 8 is a flow diagram illustrating activities associated with a shutter animation according to at least one example embodiment.

FIG. 8 is a flow diagram illustrating activities associated with a shutter animation according to at least one example embodiment. In at least one example embodiment, there is a set of operations that corresponds with the activities of FIG. 8. An apparatus, for example electronic apparatus 10 of FIG. 1, or a portion thereof, may utilize the set of operations. The apparatus may comprise means, including, for example processor 11 of FIG. 1, for performance of such operations. In an example embodiment, an apparatus, for example electronic apparatus 10 of FIG. 1, is transformed by having memory, for example memory 12 of FIG. 1, comprising computer code configured to, working with a processor, for example processor 11 of FIG. 1, cause the apparatus to perform set of operations of FIG. 8.

In some circumstances, the user may desire to continue to capture other images after capturing the image. For example, the user may desire to capture a plurality of images within a particular time period. In at least one example embodiment, the apparatus terminates display of the image based, at least in part, on completion of the shutter animation. For example the apparatus may terminate display of the image upon completion of the shutter animation, after elapse of a predetermined duration subsequent to completion of the shutter animation, and/or the like.

At block 802, the apparatus receives visual information from a camera module, similarly as described regarding block 602 of FIG. 6. At block 804, the apparatus causes display of a representation of, at least part of, the visual information, similarly as described regarding block 604 of FIG. 6. At block 806, the apparatus determines an autofocus point based, at least in part, on the visual information, similarly as described regarding block 606 of FIG. 6. At block 808, the apparatus captures an image based, at least in part, on the visual information such that focus of the image conforms to the autofocus point, similarly as described regarding block 608 of FIG. 6. At block 810, the apparatus terminates display of the representation of the visual information based, at least in part the capture of the image, similarly as described regarding block 710 of FIG. 7. At block 812, the apparatus causes display of the image and a shutter animation such that the shutter animation overlays the image and the shutter animation has a closing point that corresponds with a position on the image that correlates with the autofocus point, similarly as described regarding block 610 of FIG. 6.

At block 814, the apparatus determines that the shutter animation has completed. The completion of the shutter animation may be indicative of rendering a final frame of the shutter animation, elapse of a duration that corresponds with the duration of the shutter animation, and/or the like.

At block 816, the apparatus terminates display of the image based, at least in part, on the determination that the shutter animation has completed. In this manner, the termination of display of the image may be caused by the determination that the shutter animation has completed. Flow may return to block 802. In this manner, the apparatus may receive different visual information from the camera module, and cause display of a representation of, at least part of, the different visual information subsequent to termination of display of the image.

Figure 9:
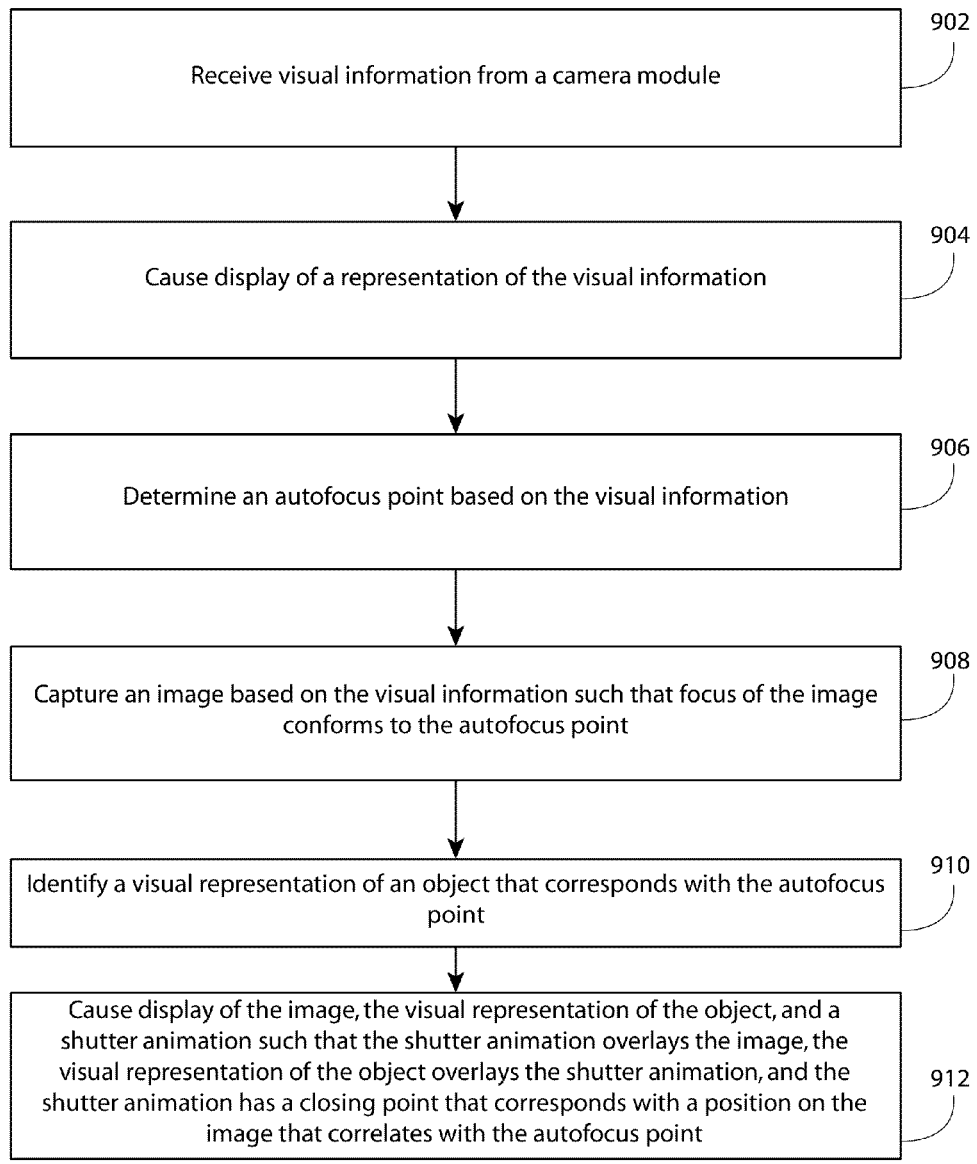
FIG. 9 is a flow diagram illustrating activities associated with a shutter animation according to at least one example embodiment.

FIG. 9 is a flow diagram illustrating activities associated with a shutter animation according to at least one example embodiment. In at least one example embodiment, there is a set of operations that corresponds with the activities of FIG. 9. An apparatus, for example electronic apparatus 10 of FIG. 1, or a portion thereof, may utilize the set of operations. The apparatus may comprise means, including, for example processor 11 of FIG. 1, for performance of such operations. In an example embodiment, an apparatus, for example electronic apparatus 10 of FIG. 1, is transformed by having memory, for example memory 12 of FIG. 1, comprising computer code configured to, working with a processor, for example processor 11 of FIG. 1, cause the apparatus to perform set of operations of FIG. 9.

As described in FIGS. 5A-5D, in some circumstances, it may be desirable to indicate prominence of a representation of an object associated with an autofocus point. In such circumstances, it may be desirable to cause display of a representation of the object that overlays the shutter animation.

At block 902, the apparatus receives visual information from a camera module, similarly as described regarding block 602 of FIG. 6. At block 904, the apparatus causes display of a representation of, at least part of, the visual information, similarly as described regarding block 604 of FIG. 6. At block 906, the apparatus determines an autofocus point based, at least in part, on the visual information, similarly as described regarding block 606 of FIG. 6. At block 908, the apparatus captures an image based, at least in part, on the visual information such that focus of the image conforms to the autofocus point, similarly as described regarding block 608 of FIG. 6.

At block 910, the apparatus identifies a visual representation of an object that corresponds with the autofocus point. The identification and the visual representation may be similar as described regarding FIGS. 5A-5D.

At block 912, the apparatus causes display of the image a shutter animation, and the visual representation of the object such that the shutter animation overlays the image, the visual representation of the object overlays the shutter animation, and the shutter animation has a closing point that corresponds with a position on the image that correlates with the autofocus point. The image, the shutter animation, the overlays, the correspondence, and the position may be similar as described regarding FIGS. 5A-5D.

Embodiments of the invention may be implemented in software, hardware, application logic or a combination of software, hardware, and application logic. The software, application logic and/or hardware may reside on the apparatus, a separate device, or a plurality of separate devices. If desired, part of the software, application logic and/or hardware may reside on the apparatus, part of the software, application logic and/or hardware may reside on a separate device, and part of the software, application logic and/or hardware may reside on a plurality of separate devices. In an example embodiment, the application logic, software or an instruction set is maintained on any one of various conventional computer-readable media.

If desired, the different functions discussed herein may be performed in a different order and/or concurrently with each other. For example, block 604 of FIG. 6 may be performed after block 606 of FIG. 6. Furthermore, if desired, one or more of the above-described functions may be optional or may be combined. For example, block 710 of FIG. 7 may be optional and/or combined with block 708 of FIG. 7.

Although various aspects of the invention are set out in the independent claims, other aspects of the invention comprise other combinations of features from the described embodiments and/or the dependent claims with the features of the independent claims, and not solely the combinations explicitly set out in the claims.

It is also noted herein that while the above describes example embodiments of the invention, these descriptions should not be viewed in a limiting sense. Rather, there are variations and modifications which may be made without departing from the scope of the present invention as defined in the appended claims.

What is claimed is:

1. An apparatus, comprising:
   at least one processor;
   at least one memory including computer program code, the computer program code that, when executed by the processor, causes the apparatus to:
   receive visual information from a camera module;
   cause display of a representation of, at least part of, the visual information;
   determine an autofocus point based, at least in part, on the visual information;
   capture an image based, at least in part, on the visual information such that focus of the image conforms to the autofocus point and the autofocus point fails to correspond with a center of the image; and
   cause display of the image and a shutter animation such that the shutter animation overlays the image and the shutter animation has a closing point that corresponds with a position on the image that correlates with the autofocus point.

2. The apparatus of claim 1, wherein the memory includes computer program code that, when executed by the processor, causes the apparatus to terminate the display of the representation of the visual information based, at least in part, on the capture of the image.

3. The apparatus of claim 1, wherein the memory includes computer program code that, when executed by the processor, causes the apparatus to:
   determine that the shutter animation has completed;
   terminate the display of the image based, at least in part, on the determination that the shutter animation has completed;
   receive different visual information from the camera module; and
   cause display of a representation of, at least part of, the different visual information.

4. The apparatus of claim 1, wherein the shutter animation comprises a succession of images that indicate a closing aperture that is centered at the closing point, such that, at least part of, the image is visible within the closing aperture.

5. The apparatus of claim 4, wherein the shutter animation further comprises a succession of images that indicate an opening aperture that is centered at the closing point, such that, at least part of, the image is visible within the opening aperture.

6. The apparatus of claim 5, wherein the shutter animation comprises the succession of images that indicate the opening aperture subsequent to the images that indicate the closing aperture.

7. The apparatus of claim 1, wherein the memory includes computer program code that, when executed by the processor, causes the apparatus to:
   identify of a visual representation of an object that corresponds with the autofocus point;
   cause display of the visual representation of the object such that the visual representation of the object overlays the shutter animation;
   determine that the shutter animation has completed; and
   terminate the display of the representation of the object based, at least in part, on the determination that the shutter animation has completed.

8. The apparatus of claim 1, wherein the closing point is at a position that fails to correlate with a center of the image.

9. The apparatus of claim 1, wherein the apparatus comprises the camera module.

10. A method comprising:
    receiving visual information from a camera module;
    causing display of a representation of, at least part of, the visual information;
    determining an autofocus point based, at least in part, on the visual information;
    capturing an image based, at least in part, on the visual information such that focus of the image conforms to the autofocus point and the autofocus point fails to correspond with a center of the image; and
    causing display of the image and a shutter animation such that the shutter animation overlays the image and the shutter animation has a closing point that corresponds with a position on the image that correlates with the autofocus point.

11. The method of claim 10, further comprising terminating the display of the representation of the visual information based, at least in part, on the capture of the image.

12. The method of claim 10, further comprising:
    determining that the shutter animation has completed;
    terminating the display of the image based, at least in part, on the determination that the shutter animation has completed;
    receiving different visual information from the camera module; and
    causing display of a representation of, at least part of, the different visual information.

13. The method of claim 10, wherein the shutter animation comprises a succession of images that indicate a closing aperture that is centered at the closing point, such that, at least part of, the image is visible within the closing aperture.

14. The method of claim 13, wherein the shutter animation further comprises a succession of images that indicate an opening aperture that is centered at the closing point, such that, at least part of, the image is visible within the opening aperture.

15. The method of claim 14, wherein the shutter animation comprises the succession of images that indicate the opening aperture subsequent to the images that indicate the closing aperture.

16. The method of claim 10, further comprising:
    identifying a visual representation of an object that corresponds with the autofocus point;
    causing display of the visual representation of the object such that the visual representation of the object overlays the shutter animation;
    determining that the shutter animation has completed; and
    terminating the display of the representation of the object based, at least in part, on the determination that the shutter animation has completed.

17. At least one non-transitory computer-readable medium encoded with instructions that, when executed by a processor, perform:
- receiving visual information from a camera module;
- causing display of a representation of, at least part of, the visual information;
- determining an autofocus point based, at least in part, on the visual information;
- capturing an image based, at least in part, on the visual information such that focus of the image conforms to the autofocus point and the autofocus point fails to correspond with a center of the image; and
- causing display of the image and a shutter animation such that the shutter animation overlays the image and the shutter animation has a closing point that corresponds with a position on the image that correlates with the autofocus point.

18. The medium of claim 17, further encoded with instructions that, when executed by a processor, perform terminating the display of the representation of the visual information based, at least in part, on the capture of the image.

19. The medium of claim 17, further encoded with instructions that, when executed by a processor, perform:
- determining that the shutter animation has completed;
- terminating the display of the image based, at least in part, on the determination that the shutter animation has completed;
- receiving the different visual information from the camera module; and
- causing display of a representation of, at least part of, the different visual information.

20. The medium of claim 17, wherein the shutter animation comprises a succession of images that indicate a closing aperture that is centered at the closing point, such that, at least part of, the image is visible within the closing aperture.

* * * * *